US009015443B2

(12) United States Patent
Aho et al.

(10) Patent No.: US 9,015,443 B2
(45) Date of Patent: Apr. 21, 2015

(54) REDUCING REMOTE READS OF MEMORY IN A HYBRID COMPUTING ENVIRONMENT

(75) Inventors: Michael E. Aho, Rochester, MN (US); Charles J. Archer, Rochester, MN (US); James E. Carey, Rochester, MN (US); Matthew W. Markland, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/771,627

(22) Filed: Apr. 30, 2010

(65) Prior Publication Data

US 2011/0271059 A1 Nov. 3, 2011

(51) Int. Cl.

| | |
|---|---|
| ***G06F 12/02*** | (2006.01) |
| ***G06F 9/38*** | (2006.01) |
| ***G06F 9/54*** | (2006.01) |

(52) U.S. Cl.

CPC .............. *G06F 9/3881* (2013.01); *G06F 9/544* (2013.01)

(58) Field of Classification Search

None

See application file for complete search history.

(56) References Cited

U.S. PATENT DOCUMENTS

| | | | |
|---|---|---|---|
| 4,989,131 | A | 1/1991 | Stone |
| 5,073,851 | A | 12/1991 | Masterson et al. |
| 5,363,484 | A | 11/1994 | Desnoyers et al. |
| 5,467,459 | A | 11/1995 | Alexander et al. |
| 5,548,761 | A | 8/1996 | Balsundaram et al. |
| 5,590,345 | A | 12/1996 | Barker et al. |
| 5,613,146 | A | 3/1997 | Gove et al. |
| 5,835,961 | A | 11/1998 | Harvey et al. |
| 5,873,127 | A | 2/1999 | Harvey et al. |
| 5,983,329 | A | 11/1999 | Thaler et al. |
| 6,061,773 | A | 5/2000 | Harvey et al. |
| 6,070,194 | A | 5/2000 | Yu et al. |
| 6,125,430 | A | 9/2000 | Noel et al. |
| 6,266,745 | B1 | 7/2001 | De Backer et al. |
| 6,275,857 | B1 | 8/2001 | McCartney |
| 6,308,255 | B1 | 10/2001 | Gorishek et al. |
| 6,330,659 | B1 | 12/2001 | Poff et al. |
| 6,377,979 | B1 | 4/2002 | Yamashita et al. |
| 6,473,849 | B1 | 10/2002 | Keller et al. |
| 6,553,411 | B1 | 4/2003 | Dias et al. |
| 6,556,659 | B1 | 4/2003 | Bowman-Amuah |
| 6,598,130 | B2 | 7/2003 | Harris et al. |
| 6,651,132 | B1 | 11/2003 | Trau |
| 6,658,522 | B1 | 12/2003 | Martin et al. |

(Continued)

OTHER PUBLICATIONS

U.S. Appl. No. 12/204,842, filed Sep. 2008, Aho et al.

(Continued)

*Primary Examiner* — Charles Rones
*Assistant Examiner* — Ryan Dare
(74) *Attorney, Agent, or Firm* — Biggers Kennedy Lenart Spraggins LLP

(57) ABSTRACT

A hybrid computing environment in which the host computer allocates, in the shadow memory area of the host computer, a memory region for a packet to be written to the shared memory of an accelerator; writes packet data to the accelerator's shared memory in a memory region corresponding to the allocated memory region; inserts, in a next available element of the accelerator's descriptor array, a descriptor identifying the written packet data; increments the copy of the head pointer of the accelerator's descriptor array maintained on the host computer; and updates a copy of the head pointer of the accelerator's descriptor array maintained on the accelerator with the incremented copy.

22 Claims, 10 Drawing Sheets

(56) References Cited

U.S. PATENT DOCUMENTS

| | | | |
|---|---|---|---|
| 6,848,106 | B1 | 1/2005 | Hipp |
| 6,918,070 | B1 | 7/2005 | Sharma |
| 6,948,034 | B2 | 9/2005 | Aoki |
| 7,383,330 | B2 | 6/2008 | Moran et al. |
| 7,418,574 | B2 | 8/2008 | Mathur et al. |
| 7,428,573 | B2 | 9/2008 | McCanne et al. |
| 7,436,824 | B2 | 10/2008 | Pepenella |
| 7,437,403 | B2 | 10/2008 | Xue et al. |
| 7,469,273 | B2 | 12/2008 | Anderson et al. |
| 7,478,154 | B2 | 1/2009 | Cochran et al. |
| 7,631,023 | B1 | 12/2009 | Kaiser et al. |
| 7,668,924 | B1 | 2/2010 | Youn et al. |
| 7,725,905 | B1 | 5/2010 | Doshi et al. |
| 7,752,417 | B2 | 7/2010 | Manczak et al. |
| 7,814,295 | B2 | 10/2010 | Inglett et al. |
| 7,904,929 | B1 | 3/2011 | Jaunin et al. |
| 7,984,267 | B2 | 7/2011 | Aho et al. |
| 7,991,803 | B2 | 8/2011 | Mercer et al. |
| 8,001,206 | B2 | 8/2011 | Archer et al. |
| 8,037,217 | B2 | 10/2011 | Arroyo et al. |
| 8,132,106 | B2 | 3/2012 | Low et al. |
| 2002/0029289 | A1 | 3/2002 | Byrne |
| 2002/0056033 | A1 | 5/2002 | Huppenthal |
| 2002/0108059 | A1 | 8/2002 | Canion et al. |
| 2002/0112091 | A1 | 8/2002 | Schott et al. |
| 2002/0184217 | A1 | 12/2002 | Bisbee et al. |
| 2003/0028751 | A1 | 2/2003 | McDonald et al. |
| 2003/0061432 | A1 | 3/2003 | Huppenthal et al. |
| 2003/0120723 | A1 | 6/2003 | Bright et al. |
| 2003/0226018 | A1 | 12/2003 | Tardo et al. |
| 2004/0221127 | A1 | 11/2004 | Ang |
| 2005/0273571 | A1 | 12/2005 | Lyon et al. |
| 2005/0278409 | A1 | 12/2005 | Kutzik et al. |
| 2005/0278680 | A1 | 12/2005 | Mukherjee et al. |
| 2006/0018341 | A1 | 1/2006 | Pettery et al. |
| 2006/0085789 | A1 | 4/2006 | Laborczfalvi et al. |
| 2006/0168435 | A1 | 7/2006 | Svensson et al. |
| 2006/0224830 | A1 | 10/2006 | Davis et al. |
| 2007/0112999 | A1 | 5/2007 | Oney et al. |
| 2007/0113227 | A1 | 5/2007 | Oney et al. |
| 2007/0226807 | A1 | 9/2007 | Ginter et al. |
| 2007/0255802 | A1 | 11/2007 | Aloni et al. |
| 2007/0294505 | A1 | 12/2007 | Traut et al. |
| 2008/0028103 | A1 | 1/2008 | Schlansker et al. |
| 2008/0091855 | A1 | 4/2008 | Moertl et al. |
| 2008/0114937 | A1 | 5/2008 | Reid et al. |
| 2008/0183882 | A1 | 7/2008 | Flynn et al. |
| 2008/0222396 | A1 | 9/2008 | Spracklen et al. |
| 2008/0256330 | A1 | 10/2008 | Wang et al. |
| 2008/0259086 | A1 | 10/2008 | Doi et al. |
| 2008/0288747 | A1 | 11/2008 | Inglett et al. |
| 2009/0024734 | A1 | 1/2009 | Merbach et al. |
| 2009/0080428 | A1 | 3/2009 | Witkowski et al. |
| 2009/0110326 | A1 | 4/2009 | Kim et al. |
| 2009/0182976 | A1 | 7/2009 | Agesen |
| 2009/0276601 | A1 | 11/2009 | Kancheria |
| 2010/0036940 | A1 | 2/2010 | Carey et al. |
| 2010/0058031 | A1 | 3/2010 | Aho et al. |
| 2010/0058356 | A1 | 3/2010 | Aho et al. |
| 2010/0064295 | A1 | 3/2010 | Aho et al. |
| 2010/0107243 | A1 | 4/2010 | Moyer et al. |
| 2010/0153541 | A1 | 6/2010 | Arimilli et al. |
| 2010/0191711 | A1 | 7/2010 | Carey et al. |
| 2010/0191822 | A1 | 7/2010 | Archer et al. |
| 2010/0191823 | A1 | 7/2010 | Archer et al. |
| 2010/0191909 | A1 | 7/2010 | Archer et al. |
| 2010/0191917 | A1 | 7/2010 | Archer et al. |
| 2010/0191923 | A1 | 7/2010 | Archer et al. |
| 2010/0192123 | A1 | 7/2010 | Carey et al. |
| 2010/0198997 | A1 | 8/2010 | Archer et al. |
| 2010/0250877 | A1 | 9/2010 | Gaither et al. |
| 2010/0274868 | A1 | 10/2010 | Arroyo et al. |
| 2011/0035556 | A1 | 2/2011 | Aho et al. |
| 2011/0191785 | A1 | 8/2011 | Archer et al. |
| 2011/0225226 | A1 | 9/2011 | Archer et al. |
| 2011/0225255 | A1 | 9/2011 | Archer et al. |
| 2011/0225297 | A1 | 9/2011 | Archer et al. |
| 2011/0238949 | A1 | 9/2011 | Archer et al. |
| 2011/0239003 | A1 | 9/2011 | Archer et al. |
| 2011/0267197 | A1 | 11/2011 | Archer et al. |
| 2011/0271263 | A1 | 11/2011 | Archer et al. |
| 2012/0191920 | A1 | 7/2012 | Aho et al. |
| 2012/0192204 | A1 | 7/2012 | Aho et al. |
| 2013/0060844 | A1 | 3/2013 | Archer et al. |
| 2013/0179901 | A1 | 7/2013 | Aho et al. |
| 2013/0238860 | A1 | 9/2013 | Archer et al. |

OTHER PUBLICATIONS

U.S. Appl. No. 12/204,352, filed Sep. 2008, Aho et al.
U.S. Appl. No. 12/204,391, filed Sep. 2008, Aho et al.
U.S. Appl. No. 12/189,342, filed Aug. 2008, Carey et al.
U.S. Appl. No. 12/358,663, filed Jan. 2009, Archer et al.
U.S. Appl. No. 12/699,162, filed Feb. 2010, Archer et al.
U.S. Appl. No. 12/362,137, filed Jan. 2009, Archer et al.
U.S. Appl. No. 12/359,383, filed Jan. 2009, Archer et al.
U.S. Appl. No. 12/361,943, filed Jan. 2009, Archer et al.
U.S. Appl. No. 12/360,930, filed Jan. 2009, Carey et al.
U.S. Appl. No. 12/364,590, filed Feb. 2009, Archer et al.
U.S. Appl. No. 12/360,158, filed Jan. 2009, Carey et al.
U.S. Appl. No. 12/537,377, filed Aug. 2009, Aho et al.
U.S. Appl. No. 12/361,910, filed Jan. 2009, Archer et al.
U.S. Appl. No. 12/428,646, filed Apr. 2009, Arroyo et al.
U.S. Appl. No. 12/771,627, filed Apr. 2010, Aho et al.
Rexford, Jennifer, Bonomi Flavio; Greenberg Albert, Wong Albert, "Scalable Architectures for Integrated Traffic Shaping and Link Scheduling in High-Speed ATM Switches", Jun. 5, 1997, IEEE Journal on Selected Areas in Communications, vol. 15 No. 5, pp. 938-950.
Rabenseifner, Rolf, Some Aspects of Message-Passing on Future Hybrid Systems, www.springerlink.com [online], 2008 [accessed online on Nov. 12, 2010], URL: http://www.springerlink.com/content/m12170217065w185/.
Ball, Stuard, Introduction to direct memory access, www.eetimes.com [online], Oct. 14, 2003 [accessed online on Nov. 12, 2010], URL: http;//www.eetimes.com/discussion/other/4024879/introduction-to-direct-memory-access.
Office Action, U.S. Appl. No. 12/204,352, Mail Date Dec. 16, 2010.
Final Office Action, U.S. Appl. No. 12/189,342, Mail Date Dec. 23, 2010.
Office Action, U.S. Appl. No. 12/362,137, Mail Date Nov. 22, 2010.
Office Action, U.S. Appl. No. 12/364,590, Mail Date Nov. 26, 2010.
Office Action, U.S. Appl. No. 12/361,910, Mail Date Nov. 19, 2010.
Office Action, U.S. Appl. No. 12/428,646, Mail Date Feb. 7, 2011.
Notice of Allowance, U.S. Appl. No. 12/204,352, Mail Date Mar. 14, 2011.
Final Office Action, U.S. Appl. No. 12/362,137, Mail Date Apr. 25, 2011.
Notice of Allowance, U.S. Appl. No. 12/364,590, Mail Date Apr. 29, 2011.
Notice of Allowance, U.S. Appl. No. 12/361,910, Mail Date Apr. 5, 2011.
Office Action, U.S. Appl. No. 12/189,342, Mail Date Jul. 26, 2011.
Office Action, U.S. Appl. No. 12/360,930, Mail Date Dec. 29, 2011.
Notice of Allowance, U.S. Appl. No. 12/204,842, Mail Date Mar. 19, 2012.
Final Office Action, U.S. Appl. No. 12/358,663, Mail Date Mar. 21, 2012.
Final Office Action, U.S. Appl. No. 12/359,383, Mail Date Jan. 27, 2012.
Final Office Action, U.S. Appl. No. 12/361,943, Mail Date Jan. 31, 2012.
Office Action, U.S. Appl. No. 12/360,158, Mail Date Jan. 19, 2012.
Notice of Allowance, U.S. Appl. No. 12/248,646, Mail Date Jun. 9, 2011.
Office Action, U.S. Appl. No. 12/699,162, Mail Date Apr. 27, 2012.
Buonadonna, Phillip, Culler, David, "Queue Pair IP: A Hybrid Architecture for System Area Networks", Aug. 7, 2002. Computer Architecture. 2002. Proceedings. 29th Annual Symposium. pp. 247-256.

(56) References Cited

OTHER PUBLICATIONS

Brightwell, Rin, Doerfler, Doug, Underwood D., Keith, "A Preliminary Analysis of the Infiniband and XD1 Network Interfaces", Jun. 26, 2006, Parallel and Distribution Processing Symposium, 2006. IPDPS 2006. 20th International, p. 8.
Office Action, U.S. Appl. No. 12/189,342, Mail Date Aug. 11, 2008.
Office Action, U.S. Appl. No. 12/204,391, Mail Date Aug. 17, 2011.
Office Action, U.S. Appl. No. 12/358,663, Mail Date Oct. 5, 2011.
Office Action, U.S. Appl. No. 12/359,383, Mail Date Aug. 5, 2011.
Office Action, U.S. Appl. No. 12/361,943, Mail Date Sep. 21, 2011.
Martellaro, "Using the cell processor as an offload streaming assist for sessionization of network traffic for cross packet inspector", Aug. 2008, pp. 21-24.
Notice of Allowance, U.S. Appl. No. 12/358,663, Mail Date Jan. 14, 2013.
RCE filed, U.S. Appl. No. 12/358,663, Mail Date Mar. 21, 2013.
Office Action, U.S. Appl. No. 12/748,559, Mail Date Feb. 21, 2013.
Office Action, U.S. Appl. No. 13/664,557, Mail Date Feb. 1, 2013.
Notice of Allowance, U.S. Appl. No. 12/204,391, Mail Date Dec. 7, 2011.
Advisory Action, U.S. Appl. No. 12/358,663, Mail Date Jun. 18, 2012.
Notice of Allowance, U.S. Appl. No. 12/537,377, Mail Date Jan. 13, 2012.
Notice of Allowance, U.S. Appl. No. 12/428,646, Mail Date Jun. 9, 2011.
Office Action, U.S. Appl. No. 12/771,627, Mail Date Jul. 9, 2012.
Final Office Action, U.S. Appl. No. 12/699,162, Mail Date Aug. 8, 2012.
Office Action, U.S. Appl. No. 12/360,158, Mail Date Aug. 6, 2012.
Office Action, U.S. Appl. No. 13/416,636, Mail Date Sep. 7, 2012.
Office Action, U.S. Appl. No. 13/439,479, Mail Date Nov. 2, 2012.

REDUCING REMOTE READS OF MEMORY IN A HYBRID COMPUTING ENVIRONMENT

BACKGROUND OF THE INVENTION

1. Field of the Invention

The field of the invention is data processing, or, more specifically, methods, apparatus, and products for reducing remote reads of memory in a hybrid computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have advanced such that some computing environments now include core components of different architectures which operate together to complete data processing tasks. Such computing environments are described in this specification as 'hybrid' environments, denoting that such environments include host computers and accelerators having different architectures. Although hybrid computing environments are more computationally powerful and efficient in data processing than many non-hybrid computing environments, such hybrid computing environments still present substantial challenges to the science of automated computing machinery.

SUMMARY OF THE INVENTION

Methods, hybrid computing environments, and products for reducing remote reads of memory in a hybrid computing environment are disclosed, in which the hybrid computing environment includes a host computer having a host computer architecture, a plurality of accelerators having an accelerator architecture, the accelerator architecture optimized, with respect to the host computer architecture, for speed of execution of a particular class of computing functions, the host computer and the accelerators adapted to one another for data communications by a system level message passing module, the host computer having local memory shared remotely with the accelerators and having a shadow memory area, each accelerator having local memory shared remotely with the host computer and including a descriptor array, the descriptor array including a number of elements configured to store a descriptor identifying packet data to be read from the accelerator's shared memory.

In embodiments of the present invention, reducing remote reads of memory in the hybrid computing environment include allocating, by the host computer in the shadow memory area of the host computer, a memory region for a packet to be written to the shared memory of an accelerator, writing packet data by the host computer to the accelerator's shared memory in a memory region corresponding to the allocated memory region in the host computer's shadow memory area; inserting, by the host computer in a next available element of the accelerator's descriptor array, a descriptor identifying the written packet data including identifying the next available element of the accelerator's descriptor array from a copy of a head pointer of the accelerator's descriptor array maintained on the host computer, the head pointer configured to point to next available element of the accelerator's descriptor array; incrementing, by the host computer, the copy of the head pointer of the accelerator's descriptor array maintained on the host computer; and updating, by the host computer, a copy of the head pointer of the accelerator's descriptor array maintained on the accelerator with the incremented copy.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
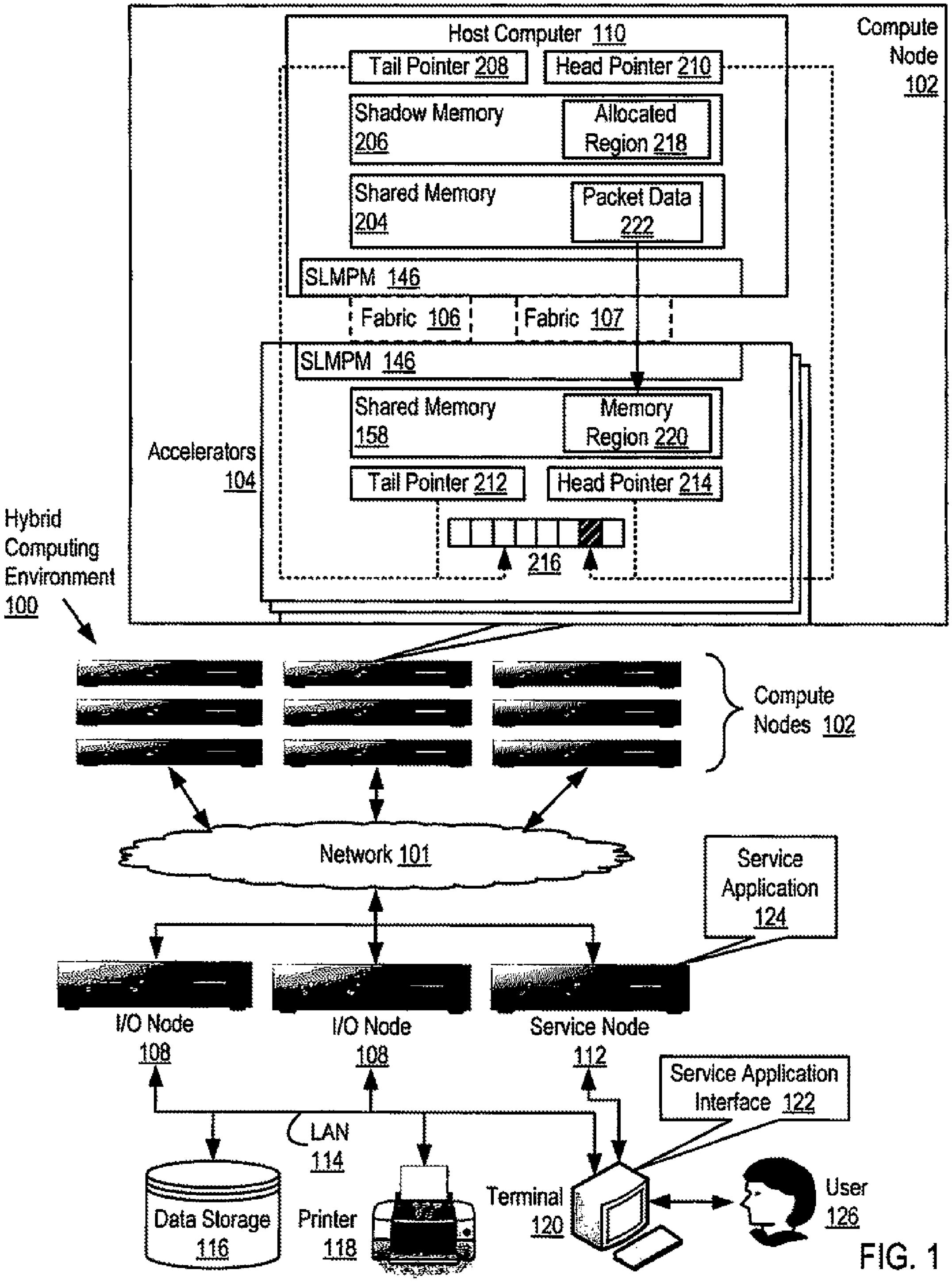
FIG. 1 sets forth a diagram of an example hybrid computing environment useful for reducing remote reads of memory according to embodiments of the present invention.

Exemplary methods, hybrid computing environments, and products for reducing remote reads of memory according to embodiments of the present invention are described with reference to the accompanying drawings, beginning with FIG. 1. FIG. 1 sets forth a diagram of an example hybrid computing environment (100) useful for reducing remote reads of memory according to embodiments of the present invention. A 'hybrid computing environment,' as the term is used in this specification, is a computing environment in that it includes computer processors operatively coupled to computer memory so as to implement data processing in the form of execution of computer program instructions stored in the memory and executed on the processors. In addition, the hybrid computing environment (100) in the example of FIG. 1 includes at least one host computer having a host architecture that operates in cooperation with an accelerator having an accelerator architecture where the host architecture and accelerator architecture are different architectures. The host and accelerator architectures in this example are characterized by architectural registers, registers that are accessible by computer program instructions that execute on each architecture, registers such as, for example, an instruction register, a program counter, memory index registers, stack pointers, and the like. That is, the number, type, structure, and relations among the architectural registers of the two architectures are different, so different that computer program instructions compiled for execution on the host computer of a hybrid computing environment typically cannot be executed natively by any associated accelerator of the hybrid computing environment.

Examples of hybrid computing environments include a data processing system that in turn includes one or more host computers, each having an x86 processor, and accelerators whose architectural registers implement the PowerPC instruction set. Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

The example hybrid computing environment (100) of FIG. 1 includes a plurality of compute nodes (102), I/O nodes (108), and a service node (112). The compute nodes (102) are coupled through network (101) for data communications with one another and with the I/O nodes (108) and the service node (112). The data communications network (101) may be implemented as an Ethernet, Internet Protocol ('IP'), PCIe, Infiniband, Fibre Channel, or other network as will occur to readers of skill in the art.

In the example hybrid computing environment (100) of FIG. 1, the compute nodes carry out principal user-level computer program execution, accepting administrative services, such as initial program loads and the like, from the service application (124) executing on the service node (112) and gaining access to data storage (116) and I/O functionality (118, 120) through the I/O nodes (108). In the example of FIG. 1, the I/O nodes (108) are connected for data communications to I/O devices (116, 118, 120) through a local area network ('LAN') (114) implemented using high-speed Ethernet or a data communications fabric of another fabric type as will occur to those of skill in the art. I/O devices in the example hybrid computing environment (100) of FIG. 1 include non-volatile memory for the computing environment in the form of data storage device (116), an output device for the hybrid computing environment in the form of printer (118), and a user (126) I/O device in the form of computer terminal (120) that executes a service application interface (122) that provides to a user an interface for configuring compute nodes in the hybrid computing environment and initiating execution by the compute nodes of principal user-level computer program instructions.

In the example of FIG. 1, each compute node includes a host computer (110) having a host computer architecture and one or more accelerators (104) having an accelerator architecture. A host computer (110) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on. An accelerator (104) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art.

Because each of the compute nodes in the example of FIG. 1 includes a host computer and an accelerator, readers of skill in the art will recognize that each compute node represents a smaller, separate hybrid computing environment within the larger hybrid computing environment (100) of FIG. 1. That is, not only may the combination of the compute nodes (102) form a hybrid computing environment (100), but it is also the case that each individual compute node may also be viewed as a separate, smaller hybrid computing environment. The hybrid computing environment (100) in the example of FIG. 1 then, may be viewed as composed of nine separate, smaller hybrid computing environments, one for each compute node, which taken together form the hybrid computing environment (100) of FIG. 1.

Within each compute node (102) of FIG. 1, a host computer (110) and one or more accelerators (104) are adapted to one another for data communications by a system level message passing module ('SLMPM') (146) and by two or more data communications fabrics (106, 107) of at least two different fabric types. An SLMPM (146) is a module or library of computer program instructions that exposes an application programming interface ('API') to user-level applications for carrying out message-based data communications between the host computer (110) and the accelerator (104). Examples of message-based data communications libraries that may be improved for use as an SLMPM according to embodiments of the present invention include:

- the Message Passing Interface or 'MPI,' an industry standard interface in two versions, first presented at Supercomputing 1994, not sanctioned by any major standards body,
- the Data Communication and Synchronization interface ('DACS') of the LANL supercomputer,
- the POSIX Threads library ('Pthreads'), an IEEE standard for distributed, multithreaded processing,
- the Open Multi-Processing interface ('OpenMP'), an industry-sanctioned specification for parallel programming, and
- other libraries that will occur to those of skill in the art.

A data communications fabric (106, 107) is a configuration of data communications hardware and software that implements a data communications coupling between a host computer and an accelerator. Examples of data communications fabric types include Peripheral Component Interconnect (PCP), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art.

The arrangement of compute nodes, data communications fabrics, networks, I/O devices, service nodes, I/O nodes, and so on, making up the hybrid computing environment (100) as illustrated in FIG. 1 are for explanation only, not for limitation of the present invention. Hybrid computing environments capable of reducing remote reads of memory according to embodiments of the present invention may include additional nodes, networks, devices, and architectures, not shown in FIG. 1, as will occur to those of skill in the art. Although the hybrid computing environment (100) in the example of FIG. 1 includes only nine compute nodes (102), readers will note that hybrid computing environments according to embodiments of the present invention may include any number of compute nodes. The LANL supercomputer, taken as an example of a hybrid computing environment with multiple compute nodes, contains as of this writing more than 12,000 compute nodes. Networks and data communications fabrics in such hybrid computing environments may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

The example hybrid computing environment (100) of FIG. 1 is configured for reducing remote reads of memory according to embodiments of the present invention. In the example hybrid computing environment (100) of FIG. 1, compute node (102) includes a host computer (110) a number of accelerators (104) adapted to one another for data communications by a system level message passing module (146) and two data communications fabrics (106, 107). The host computer (110) is configured with local memory (204) shared remotely with the accelerators (104) and a shadow memory area (206). Each accelerator (104) has local memory (158) shared remotely with the host computer (110). Each accelerator also includes a descriptor array (216). The descriptor array includes a number of elements, with each element configured to store a descriptor identifying packet data to be read from the accelerator's shared memory (158). Such a descriptor, for example, may identify a starting memory address and an offset defining the length or size of the data to be read from the accelerator's (104) shared memory (158).

As explained below in more detail, the memory region (206) of the host computer (110) is described as a 'shadow' memory area (206) because the area 'shadows' or mirrors another memory area; in this example, the accelerator's shared memory (158). The hybrid computing environment (100) may reduce remote reads of shared memory by allocating, by the host computer (110) in the shadow memory area (206) of the host computer (110), a memory region (218) for a packet to be written to the shared memory of an accelerator. After allocating the memory region in the shadow memory area, the host computer (110) may then write packet data (222) to the accelerator's shared memory (158) in a memory region (220) corresponding to the allocated memory region in the host computer's shadow memory area. After writing the packet data (222) to the accelerator's shared memory (158), the host computer (110) may also insert, in a next available element of the accelerator's descriptor array (216), a descriptor identifying the written packet data (222). The host computer (110) may insert the descriptor, represented in FIG. 1 as a shaded element, in the accelerator's (104) descriptor array (216) by identifying the next available element of the accelerator's descriptor array (216) from a copy of a head pointer (210) of the accelerator's descriptor array maintained on the host computer (110). In the example of FIG. 1, the head pointer (210) is configured to point to next available element of the accelerator's descriptor array (216). After inserting the descriptor, the host computer (110) may increment the copy (210) of the head pointer of the accelerator's descriptor array (216) maintained on the host computer (110) and may update a copy (214) of the head pointer of the accelerator's (104) descriptor array (216) maintained on the accelerator with the incremented copy (210).

Figure 2:
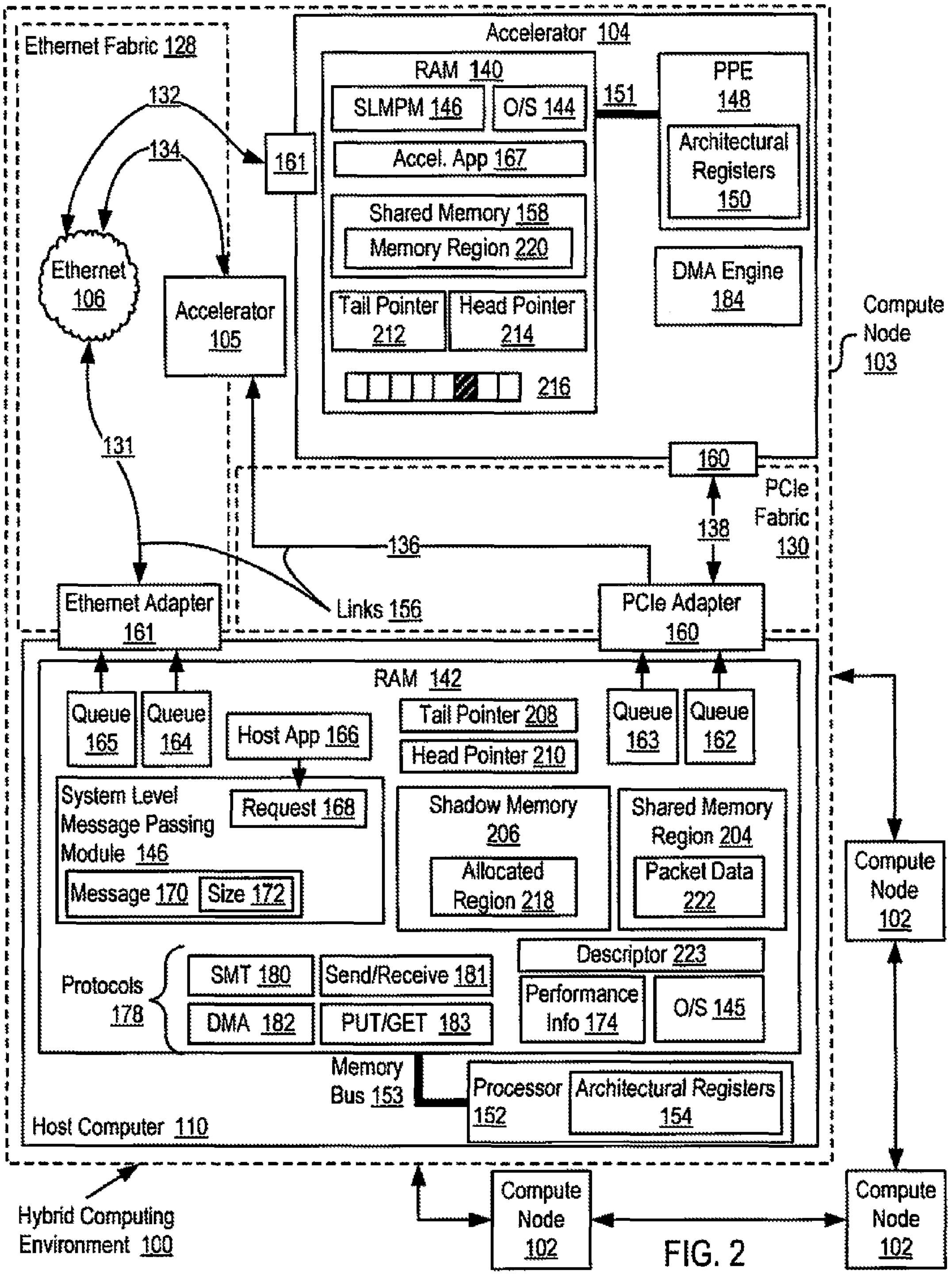
FIG. 2 sets forth a block diagram of an exemplary hybrid computing environment useful for reducing remote reads of memory according to embodiments of the present invention.

For further explanation, FIG. 2 sets forth a block diagram of an exemplary hybrid computing environment (100) useful for reducing remote reads of memory according to embodiments of the present invention. The hybrid computing environment (100) of FIG. 2 includes four compute nodes. Similar to the compute nodes of FIG. 1, each of the compute nodes in the example of FIG. 2 may represent a small, separate hybrid computing environment which taken together make up a larger hybrid computing environment. One compute node (103) in the example of FIG. 2 is illustrated in an expanded view to aid a more detailed explanation of such a hybrid computing environment (100). As shown in the expanded view of compute node (103), each of the compute nodes (102, 103) in the example of FIG. 2 includes a host computer (110). The host computer (110) includes a computer processor (152) operatively coupled to computer memory, Random Access Memory ('RAM') (142), through a high speed memory bus (153). The processor (152) in each host computer (110) has a set of architectural registers (154) that defines the host computer architecture.

Each of the compute nodes also includes one or more accelerators (104, 105). Each accelerator (104, 105) includes a computer processor (148) operatively coupled to RAM (140) through a high speed memory bus (151). Stored in RAM (140,142) of the host computer and the accelerators (104, 105) is an operating system (145). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (148) of each accelerator (104, 105) has a set of architectural registers (150) that defines the accelerator architecture. The architectural registers (150) of the processor (148) of each accelerator are different from the architectural registers (154) of the processor (152) in the host computer (110). With differing architectures, it would be uncommon, although possible, for a host computer and an accelerator to support the same instruction sets. As such, computer program instructions compiled for execution on the processor (148) of an accelerator (104) generally would not be expected to execute natively on the processor (152) of the host computer (110) and vice versa. Moreover, because of the typical differences in hardware architectures between host processors and accelerators, computer program instructions compiled for execution on the processor (152) of a host computer (110) generally would not be expected to execute natively on the processor (148) of an accelerator (104) even if the accelerator supported the instruction set of the host. The accelerator architecture in example of FIG. 2 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

In the example of FIG. 2, the host computer (110) and the accelerators (104, 105) are adapted to one another for data communications by a system level message passing module ('SLMPM') (146) and two data communications fabrics (128, 130) of at least two different fabric types. In this example, to support message-based data communications between the host computer (110) and the accelerator (104), both the host computer (110) and the accelerator (104) have an SLMPM (146) so that message-based communications can both originate and be received on both sides of any coupling for data communications. Also in the example of FIG. 2, the host computer (110) and the accelerators (104, 105) are adapted to one another for data communications by a PCIe fabric (130) through PCIe communications adapters (160) and an Ethernet fabric (128) through Ethernet communications adapters (161). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

The SLMPM (146) in this example operates generally for data processing in a hybrid computing environment (100) by monitoring data communications performance for a plurality of data communications modes between the host computer (110) and the accelerators (104, 105), receiving a request (168) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 2, the monitored performance is illustrated as monitored performance data (174) stored by the SLMPM (146) in RAM (142) of the host computer (110) during operation of the compute node (103).

A data communications mode specifies a data communications fabric type, a data communications link, and a data communications protocol (178). A data communications link (156) is data communications connection between a host computer and an accelerator. In the example of FIG. 2, a link (156) between the host computer (110) and the accelerator (104) may include the PCIe connection (138) or the Ethernet connection (131, 132) through the Ethernet network (106). A link (156) between the host computer (110) and the accelerator (105) in the example of FIG. 2, may include the PCIe connection (136) or the Ethernet connection (131, 134) through the Ethernet network (106). Although only one link for each fabric type is illustrated between the host computer and the accelerator in the example of FIG. 2, readers of skill in the art will immediately recognize that there may any number of links for each fabric type.

A data communications protocol is a set of standard rules for data representation, signaling, authentication and error detection required to send information from a host computer (110) to an accelerator (104). In the example of FIG. 2, the SLMPM (146) may select one of several protocols (178) for data communications between the host computer (110) and the accelerator. Examples of such protocols (178) include shared memory transfers ('SMT') (180) executed with a send and receive operations (181), and direct memory access ('DMA') (182) executed with PUT and GET operations (183).

Shared memory transfer is a data communications protocol for passing data between a host computer and an accelerator into shared memory space (158) allocated for such a purpose such that only one instance of the data resides in memory at any time. Consider the following as an example shared memory transfer between the host computer (110) and the accelerator (104) of FIG. 2. An application (166) requests (168) a transmission of data (176) from the host computer (110) to the accelerator (104) in accordance with the SMT (180) protocol. Such a request (168) may include a memory address allocated for such shared memory. In this example, the shared memory segment (158) is illustrated in a memory location on the accelerator (104), but readers will recognize that shared memory segments may be located on the accelerator (104), on the host computer (110), on both the host computer and the accelerator, or even off the local compute node (103) entirely—so long as the segment is accessible as needed by the host and the accelerator. To carry out a shared memory transfer, the SLMPM (146) on the host computer (110) establishes a data communications connection with the SLMPM (146) executing on the accelerator (104) by a handshaking procedure similar to that in the TCP protocol. The SLMPM (146) then creates a message (170) that includes a header and a payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (168) into the message, either in the header or as part of the payload data. The SLMPM also inserts the data (176) to be transmitted in the message (170) as part of the message payload data. The message is then transmitted by a communications adapter (160, 161) across a fabric (128, 130) to the SLMPM executing on the accelerator (104) where the SLMPM stores the payload data, the data (176) that was transmitted, in shared memory space (158) in RAM (140) in accordance with the memory address in the message.

Direct memory access ('DMA') is a data communications protocol for passing data between a host computer and an accelerator with reduced operational burden on the computer processor (152). A DMA transfer essentially effects a copy of a block of memory from one location to another, typically from a host computer to an accelerator or vice versa. Either or both a host computer and accelerator may include DMA engine, an aggregation of computer hardware and software for direct memory access. Direct memory access includes reading and writing to memory of accelerators and host computers with reduced operational burden on their processors.

A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 2, only the accelerator (104) includes a DMA engine (184) while the host computer does not. In this embodiment the processor (152) on the host computer may initiate a DMA transfer of data from the host to the accelerator in one of several ways: by sending a message according to the SMT protocol to the accelerator, instructing the accelerator to perform a remote 'GET' operation, or by direct communications with the DMA engine through the PCIe fabric (130). The configuration illustrated in the example of FIG. 2 in which the accelerator (104) is the only device containing a DMA engine is for explanation only, not for limitation. Readers of skill in the art will immediately recognize that in many embodiments, both a host computer and an accelerator may include a DMA engine, while in yet other embodiments only a host computer includes a DMA engine.

To implement a DMA protocol in the hybrid computing environment of FIG. 2 some memory region is allocated for access by the DMA engine. Allocating such memory may be carried out independently from other accelerators or host computers, or may be initiated by and completed in cooperation with another accelerator or host computer. Shared memory regions, allocated according to the SMA protocol, for example, may be memory regions made available to a DMA engine. That is, the initial setup and implementation of DMA data communications in the hybrid computing environment (100) of FIG. 2 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a DMA engine on an origin device to a DMA engine on a target device. A direct 'PUT' operation allows data to be transmitted and stored on the target device with little involvement from the target device's processor. To effect minimal involvement from the target device's processor in the direct 'PUT' operation, the origin DMA engine transfers the data to be stored on the target device along with a specific identification of a storage location on the target device. The origin DMA knows the specific storage location on the target device because the specific storage location for storing the data on the target device has been previously provided by the target DMA engine to the origin DMA engine.

A remote 'GET' operation, sometimes denominated an 'rGET,' is another mode of transmitting data from a DMA engine on an origin device to a DMA engine on a target device. A remote 'GET' operation allows data to be transmitted and stored on the target device with little involvement from the origin device's processor. To effect minimal involvement from the origin device's processor in the remote 'GET' operation, the origin DMA engine stores the data in an storage location accessible by the target DMA engine, notifies the target DMA engine, directly or out-of-band through a shared memory transmission, of the storage location and the size of the data ready to be transmitted, and the target DMA engine retrieves the data from storage location.

Monitoring data communications performance for a plurality of data communications modes may include monitoring a number of requests (168) in a message transmit request queue (162-165) for a data communications link (156). In the example of FIG. 2, each message transmit request queue (162-165) is associated with one particular data communications link (156). Each queue (162-165) includes entries for messages (170) that include data (176) to be transmitted by the communications adapters (160, 161) along a data communications link (156) associated with queue.

Monitoring data communications performance for a plurality of data communications modes may also include monitoring utilization of a shared memory space (158). In the example of FIG. 2, shared memory space (158) is allocated in RAM (140) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (100) of FIG. 2, shared memory space, any memory in fact, is limited. As such, a shared memory space (158) may be filled during execution of an application program (166) such that transmission of data from the host computer (110) to an accelerator may be slowed, or even stopped, due to space limitations in the shared memory space.

In some embodiments of the present invention, the hybrid computing environment (100) of FIG. 2 may be configured to operate as a parallel computing environment in which two or more instances the application program (166) executes on two or more host computers (110) in the parallel computing environment. In such embodiments, monitoring data communications performance across data communications modes may also include aggregating data communications performance information (174) across a plurality of instances of the application program (166) executing on two or more host computers in a parallel computing environment. The aggregated performance information (174) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (146) of FIG. 2 receives, from an application program (166) on the host computer (110), a request (168) to transmit data (176) according to a data communications mode from the host computer (110) to the accelerator (104). Such data (176) may include computer program instructions compiled for execution by the accelerator (104), work piece data for an application program (167) executing on the accelerator (104), or some combination of computer program instructions and work piece data. Receiving a request (168) to transmit data (176) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (168) to transmit data (176) according to a data communications mode may be implemented as a user-level application function call through an API to the SLMPM (146), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ), may be coded according to embodiments of the present invention, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send( ) is again coded according to embodiments of the present invention to make its own determination whether to transmit the data according to the requested mode.

An identification of a particular accelerator in a function call may effectively specify a fabric type. Such a function call may include as a call parameters an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (104) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (110) to the accelerator (104), the SLMPM function called may implement a default link for the accelerator identified in the parameter of the function call for the fabric type specified by the identification of the accelerator.

The SLMPM (146) in the example of FIG. 2 also determines, in dependence upon the monitored performance (174), whether to transmit the data (176) according to the requested data communications mode. Determining whether to transmit the data (176) according to the requested data communications mode may include determining whether to transmit data by a requested fabric type, whether to transmit data through a requested data communications link, or whether to transmit data according to a requested protocol.

In hybrid computing environments, where monitoring data communications performance across data communications modes includes monitoring a number of requests in a message transmit request queue (162-165) for a data communications link, determining whether to transmit the data (176) according to the requested data communications mode may be carried out by determining whether the number of requests in the message transmit request queue exceeds a predetermined threshold. In hybrid computing environments, where monitoring data communications performance for a plurality of data communications modes includes monitoring utilization of a shared memory space, determining whether to transmit the data (176) according to the requested data communications mode may be carried out by determining whether the utilization of the shared memory space exceeds a predetermined threshold.

If the data is not to be transmitted according to the requested data communications mode, the SLMPM (146) selects, in dependence upon the monitored performance, another data communications mode for transmitting the data and transmits the data (176) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (138) of the PCIe fabric (130) to the accelerator (104). If the monitored data performance (174) indicates that the number of requests in transmit message request queue (162) associated with the link (138) exceeds a predetermined threshold, the SLMPM may select another fabric type, the Ethernet fabric (128), and link (131, 132) through which to transmit the data (176). Also consider that the monitored performance (176) indicates that current utilization of the shared memory space (158) is less than a predetermined threshold while the number of outstanding DMA transmissions in the queue (162) exceeds a predetermined threshold. In such a case, the SLMPM (146) may also select another protocol, such as a shared memory transfer, by which to transmit the data (174).

Selecting, by the SLMPM, another data communications mode for transmitting the data (172) may also include selecting a data communications protocol (178) in dependence upon data communications message size (172). Selecting a data communications protocol (178) in dependence upon data communications message size (172) may be carried out by determining whether a size of a message exceeds a predetermined threshold. For larger messages (170), the DMA protocol may be a preferred protocol as processor utilization in making a DMA transfer of a larger message (170) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (146) may effect a transmission of the data according to the selected data communications mode by instructing, through a device driver, the communications adapter for the data communications fabric type of the selected data communications mode to transmit the message (170) according to a protocol of the selected data communications mode, where the message includes in a message header, an identification of the accelerator, and in the message payload, the data (176) to be transmitted.

The example hybrid computing environment (100) of FIG. 2 is configured for reducing remote reads of memory according to embodiments of the present invention. In the example hybrid computing environment (100) of FIG. 2, compute node (103) includes a host computer (110) a number of accelerators (104, 105) adapted to one another for data communications by a system level message passing module (146) and two data communications fabrics (128, 130). The host computer (110) is configured with local memory (204) shared remotely with the accelerators (104, 105) and a shadow memory area (206). Each accelerator (104) has local memory (158) shared remotely with the host computer (110). Each accelerator also includes a descriptor array (216). The descriptor array includes a number of elements, with each element configured to store a descriptor identifying packet data to be read from the accelerator's shared memory (158). Such a descriptor, for example, may identify a starting memory address and an offset defining the length or size of the data to be read from the accelerator's (104, 105) shared memory (158).

The example hybrid computing environment (100) of FIG. 2 may reduce remote reads of shared memory by determining, by the host computer, whether the accelerator's shared memory is full. The host computer may determine whether the accelerator's (104) shared memory is full in one or more ways including, for example, by: determining, in dependence upon the host computer's (110) copy of a tail pointer (208) for the accelerator's descriptor array (216) and the host computer's (110) copy (210) of the head pointer for the accelerator's descriptor array (216), whether at least one descriptor in the accelerator's descriptor array has been processed. Determining whether at least one descriptor in the accelerator's descriptor array has been processed may be carried out by subtracting, with modulo arithmetic, the host computer's copy of the tail pointer for the accelerator's descriptor array from the host computer's copy of the head pointer for the accelerator's descriptor array.

The host computer may also determine whether the accelerator's (104) shared memory is full by, for example: determining whether the host computer's shadow memory area is full. Determining whether the host computer's (110) shadow memory area is full may be carried out by calling a 'malloc( )' function and receiving a null value as a return to the function call. A null value in return to a 'malloc( )' function call represents a lack of memory space in which to allocate. Because the host computer's shadow memory (206) mirrors the shared memory (158), when the host computer's shadow memory (206) is full—evidenced by a null value return from a 'malloc( )' function call specifying the shadow memory (206) of the host computer (110)—the shared memory region (158) of the accelerator (104) is also full.

If the accelerator's (104) shared memory (158) is full, the host computer (110) may identify one or more processed descriptors, in dependence upon a copy (208) of the tail pointer of the accelerator's descriptor array (216) maintained on the host computer (110) and the host computer's copy (210) of the head pointer of the accelerator's descriptor array (216). Here, no remote read is needed to identify processed descriptors. In the example of FIG. 2, identifying one or more processed descriptors may be carried out by subtracting, with modulo arithmetic, the host computer's copy (208) of the tail pointer from the host computer's copy (210) of the head pointer of the accelerator's descriptor array (216). Turning back to FIG. 1, for explanatory purposes, the elements between the tail pointer and the head pointer in the accelerator's (104 on FIG. 1) descriptor array (216 on FIG. 1), are non-processed, while all other descriptors have been processed. Turning back to FIG. 2, upon identifying one or more processed descriptors, the host computer (110) may then free, in the shadow memory area (206) of the host computer (110), regions of memory corresponding to the identified processed descriptors. Because the shadow memory (206) of the host computer (110) mirrors the shared memory (158) on the accelerator, freeing memory regions in the shadow memory (206) effectively operates to free corresponding memory regions in the shared memory (158) on the accelerator.

If the accelerator's shared memory is not full—or once memory regions associated with processed descriptors in the accelerator's descriptor array have been freed in the host computer's shadow memory (206)—The host computer (110) may allocate, in the shadow memory area (206) of the host computer (110), a memory region (218) for a packet to be written to the shared memory (158) of an accelerator. Such an allocation of memory may be carried out by executing a function called by a function call such as 'malloc( ).' Here, remote reads are reduced in that preparing a memory region for allocation, through a malloc( ) function call for example, typically includes one or more memory reads and writes. Metadata describing the allocated memory region is gathered and stored when allocating such a memory region. As such, if a remote memory region, say a region in the accelerator's shared memory (158), is allocated, one or more remote reads and remote writes would be carried out to prepare the memory region for allocation—gathering metadata describing the remote memory region, from the remote memory region with remote reads, and storing the metadata on the host computer (110). By contrast, in the system of FIG. 2, a memory region is allocated locally, in shadow memory, by the host computer (110) rather than remotely in the accelerator's shared memory (158).

After allocating the memory region in the shadow memory area (206), the host computer (110) may then write packet data (222) to the accelerator's shared memory (158) in a memory region (220) corresponding to the allocated memory region in the host computer's shadow memory area. In this way, the shared memory area (158) of the accelerator is maintained to some extent by the host computer (110) through allocations in the shadow memory area (206) on the host computer (110). In some embodiments, the shared memory (158) of the accelerator is designated 'read only' by the accelerator. In such an embodiment, the shared memory (158) will store no data other than that which is written to the shared memory (158) by the host computer (110). As such, the host computer may maintain the shared memory (158) of the accelerator, entirely, by maintaining allocated regions of memory in shadow memory area (206) which mirrors the accelerator's (104) shared memory (158).

After writing the packet data (222) to the accelerator's shared memory (158), the host computer (110) may then insert, in a next available element of the accelerator's descriptor array (216), a descriptor identifying the written packet data (222) The host computer (110) may insert the descriptor, represented in FIG. 2 as a shaded element, in the accelerator's (104) descriptor array (216) by identifying the next available element of the accelerator's descriptor array (216) from a copy of a head pointer (210) of the accelerator's descriptor array maintained on the host computer (110). That is, in contrast to many typical embodiments of pointers to array elements which are maintained only locally, in this example a copy of a pointer, the head pointer (214), to an array, the descriptor array (216), is maintained remotely on the host computer (110). In this way, reading the value of the head pointer (214) does not require a remote read. In the example of FIG. 2, the head pointer (210) is configured to point to next available element of the accelerator's descriptor array (216).

After inserting the descriptor, the host computer (110) may increment the copy (210) of the head pointer of the accelerator's descriptor array (216) maintained on the host computer (110) and may update a copy (214) of the head pointer of the accelerator's (104) descriptor array (216) maintained on the accelerator with the incremented copy (210). Because a copy of the head pointer is maintained locally on the hose computer (110), no remote read is required to determine the present value of the head pointer for the accelerator's descriptor array (216).

From time to time, the accelerator, at the behest of the system level message passing module (146) or at the behest of an accelerator application (167) may read the packet data (222) from the accelerator's (104) shared memory (158). In the example of FIG. 2, reading packet data from the accelerator's shared memory (158) includes identifying a non-processed descriptor in the accelerator's descriptor array (216). Identifying a non-processed descriptor in the accelerator's descriptor array (216) in the example of FIG. 2 may be carried out by the accelerator (104) by subtracting, with modulo arithmetic, the accelerator's copy of the tail pointer (212) for the accelerator's descriptor array (216) from the accelerator's copy of the head pointer (214) for the accelerator's descriptor array (216). In the example hybrid computing environment of FIG. 2, assuming the value resulting from the modulo subtraction is greater than zero—otherwise the head and tail point at the same element, a processed descriptor—the value of the tail pointer (212) points to a next non-processed descriptor in the accelerator's descriptor array (216). Upon identifying a non-processed descriptor in the accelerator's descriptor array, the accelerator (104) may copy, in dependence upon the non-processed descriptor, packet data from the accelerator's shared memory to the accelerator's user-level memory. The non-processed descriptor may identify a memory location in shared memory (158) by starting memory address and offset, of the packet data (222). The accelerator (104) may then increment the accelerator's copy (212) of the tail pointer and update the host computer's (110) copy (208) of the tail pointer with the incremented copy (212) of the tail pointer.

Although data transfer carried out in accordance with embodiments of the present invention is described and illustrated with respect to FIG. 2 with a host computer as a source of packet data and an accelerator as a consumer or target of packet data, readers of skill in the art will immediately recognize that such is not a limitation. In fact, the data communication methods carried out to reduce remote reads in accordance with embodiments of the present invention are effectively bi-directional. That is, the accelerator may write packet data to shared memory of a host computer in exactly the same manner as described above, but in reverse. In such an embodiment, the accelerator is implemented with a shadow memory and the host computer is implemented with a descriptor array; both the accelerator and host computer maintain local copies of head and tail pointer's of the host computer's descriptor array. Moreover, the two embodiments—the first embodiments in which the host computer is a packet data source and the second embodiment in which an accelerator is a packet data source—are not mutually exclusive. The two embodiments may be combined such that the host computer may be a packet data source and the accelerator may also be a packet data source; the host computer is implemented with a shadow memory mimicking the accelerator's shared memory while the accelerator is implemented with a shadow memory mimicking the host computer's shared memory; the host computer is configured with a descriptor array and the accelerator is configured with a descriptor array; the host computer includes a copy of the head and tail pointers of the local and remote descriptor arrays and the accelerator includes a copy of the head and tail pointers of the local and remote descriptor arrays; and so on as will occur to readers of skill in the art.

The hardware, software applications, computers, data communications fabrics, and other components of the computing environment of FIG. 2 are described here for clarity only, not limitation. Other devices, networks, computers, data structures, computer memory, and so on may be implemented in computing environments according to embodiments of the present invention.

Figure 3:
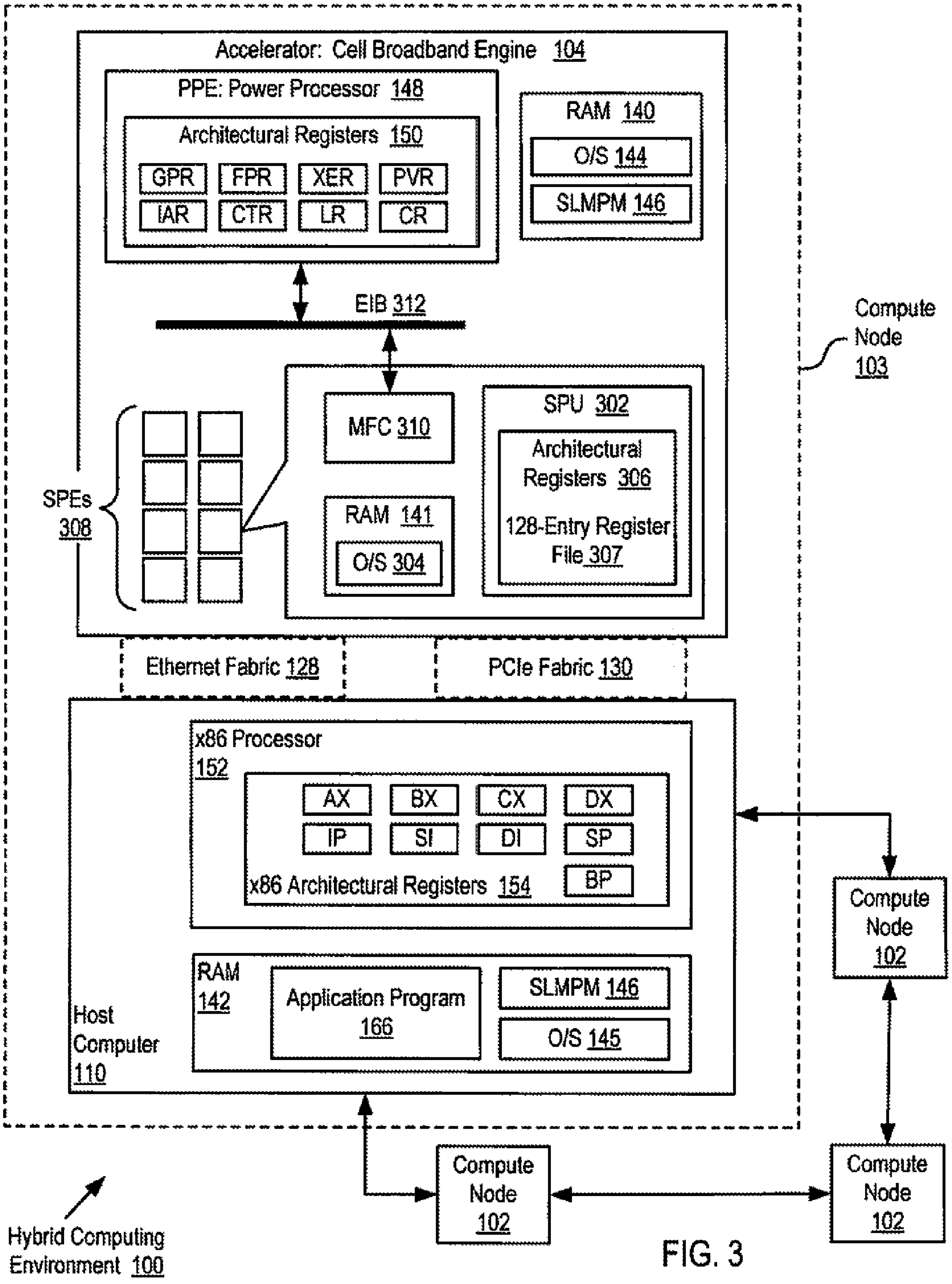
FIG. 3 sets forth a block diagram of a further exemplary hybrid computing environment useful for reducing remote reads of memory according to embodiments of the present invention.

For further explanation, FIG. 3 sets forth a block diagram of a further exemplary hybrid computing environment (100) useful for reducing remote reads of memory according to embodiments of the present invention. The hybrid computing environment of FIG. 3 is similar the hybrid computing environment of FIG. 2, including as it does, four compute nodes (102, 103), each of which includes a host computer (110) having a host computer architecture and an accelerator (104) having an accelerator architecture where the accelerator architecture is optimized, with respect to the host computer architecture, for speed of execution of a particular class of computing functions. The host computer (110) and the accelerator (104) are adapted to one another for data communications by a system level message passing module (146) and two or more data communications fabrics (128, 130) of at least two different fabric types. In the example of FIG. 3, the host computer (110) is adapted to accelerator (104) by an Ethernet fabric (128) and a PCIe fabric (130).

The host computer (110) as illustrated in the expanded view of the compute node (103) includes an x86 processor. An x86 processor is a processor whose architecture is based upon the architectural register set of the Intel x86 series of microprocessors, the 386, the 486, the 586 or Pentium™, and so on. Examples of x86 processors include the Advanced Micro Devices ('AMD') Opteron™, the AMD Phenom™, the AMD Athlon XP™, the AMD Athlon 64™, Intel Nehalam™, Intel Pentium 4, Intel Core 2 Duo, Intel Atom, and so on as will occur to those of skill in the art. The x86 processor (152) in the example of Figure illustrates a set of a typical architectural registers (154) found in many x86 processors including, for example, an accumulator register ('AX'), a base register ('BX'), a counter register ('CX'), a data register ('DX'), a source index register for string operations ('SI'), a destination index for string operations ('DI'), a stack pointer ('SP'), a stack base pointer for holding the address of the current stack frame ('BP'), and an instruction pointer that holds the current instruction address ('IP').

The accelerator (104) in the example of FIG. 3 is illustrated as a Cell Broadband Engine ('CBE') having a Cell Broadband Engine Architecture ('CBEA'). A CBEA is a microprocessor architecture jointly developed by Sony Computer Entertainment, Toshiba, and IBM, an alliance known as "STI." Microprocessors implemented according to the CBEA are sometimes referred to as 'Cell' processors or simply as CBEs. The CBEA combines a general-purpose POWER architecture core, a Power Processing Element ('PPE') (148), of modest performance with streamlined co-processing elements, called Synergistic Processing Elements ('SPEs') (308) which greatly accelerate multimedia and vector processing applications, as well as many other forms of dedicated computation. The CBE architecture emphasizes efficiency/watt, prioritizes bandwidth over latency, and favors peak computational throughput over simplicity of program code.

The accelerator (104) of FIG. 3, implemented as a CBE, includes a main processor (148) that in this example is a Power Processing Element ('PPE'), eight fully-functional co-processors called SPEs (308), and a high-bandwidth circular data bus connecting the PPE and the SPEs, called the Element Interconnect Bus ('EIB') (312). The PPE (148) is a POWER architecture processor with a two-way multithreaded core acting as a controller for the eight SPEs (308). The term "POWER architecture" here refers to IBM's different generations of processor architectures, a broad term including all products based on POWER, PowerPC and Cell architectures. The architectural registers (150) of the PPE (148) of the CBE accelerator (104) therefore are different from those of the x86 processor (152) of the host computer (110). The PPE (148) of FIG. 3 includes an example set of architectural registers (150) of the POWER architecture, including 32 general purpose registers ('GPRs'), 32 floating point registers ('FPRs'), a fixed-point exception register ('XER'), a count register ('CTR'), a Condition register ('CR'), an instruction address register ('IAR'), a link register ('LR'), and a processor version register ('PVR').

The SPEs (308) handle most of the computational workload of the CBE (104). While the SPEs are optimized for vectorized floating point code execution, the SPEs also may execute operating systems, such as, for example, a lightweight, modified version of Linux with the operating system stored in local memory (141) on the SPE. Each SPE (308) in the example of FIG. 3 includes a Synergistic Processing Unit ('SPU') (302), and a Memory Flow Controller ('MFC') (310). An SPU (302) is a Reduced Instruction Set Computing ('RISC') processor with 128-bit single instruction, multiple data ('SIMD') organization for single and double precision instructions. In some implementations, an SPU may contain a 256 KB embedded Static RAM (141) for instructions and data, called local storage which is visible to the PPE (148) and can be addressed directly by software. Each SPU (302) can support up to 4 Gigabyte ('GB') of local store memory. The local store does not operate like a conventional CPU cache because the local store is neither transparent to software nor does it contain hardware structures that predict which data to load. The SPUs (302) also implement architectural registers (306) different from those of the PPE which include a 128-bit, 128-entry register file (307). An SPU (302) can operate on 16 8-bit integers, 8 16-bit integers, 4 32-bit integers, or 4 single precision floating-point numbers in a single clock cycle, as well as execute a memory operation.

The MFC (310) integrates the SPUs (302) in the CBE (104). The MFC (310) provides an SPU with data transfer and synchronization capabilities, and implements the SPU interface to the EIB (312) which serves as the transportation hub for the CBE (104). The MFC (310) also implements the communication interface between the SPE (308) and PPE (148), and serves as a data transfer engine that performs bulk data transfers between the local storage (141) of an SPU (302) and CBE system memory, RAM (140), through DMA. By offloading data transfer from the SPUs (302) onto dedicated data transfer engines, data processing and data transfer proceeds in parallel, supporting advanced programming methods such as software pipelining and double buffering. Providing the ability to perform high performance data transfer asynchronously and in parallel with data processing on the PPE (148) and SPEs (302), the MFC (310) eliminates the need to explicitly interleave data processing and transfer at the application level.

The SLMPM (146) in the example of FIG. 3 processes data in the hybrid computing environment (100) by monitoring data communications performance for a plurality of data communications modes between the host computer (110) and the accelerator (104); receiving, from an application program (166) on the host computer (110), a request to transmit data according to a data communications mode from the host computer (110) to the accelerator (104); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

Figure 4:
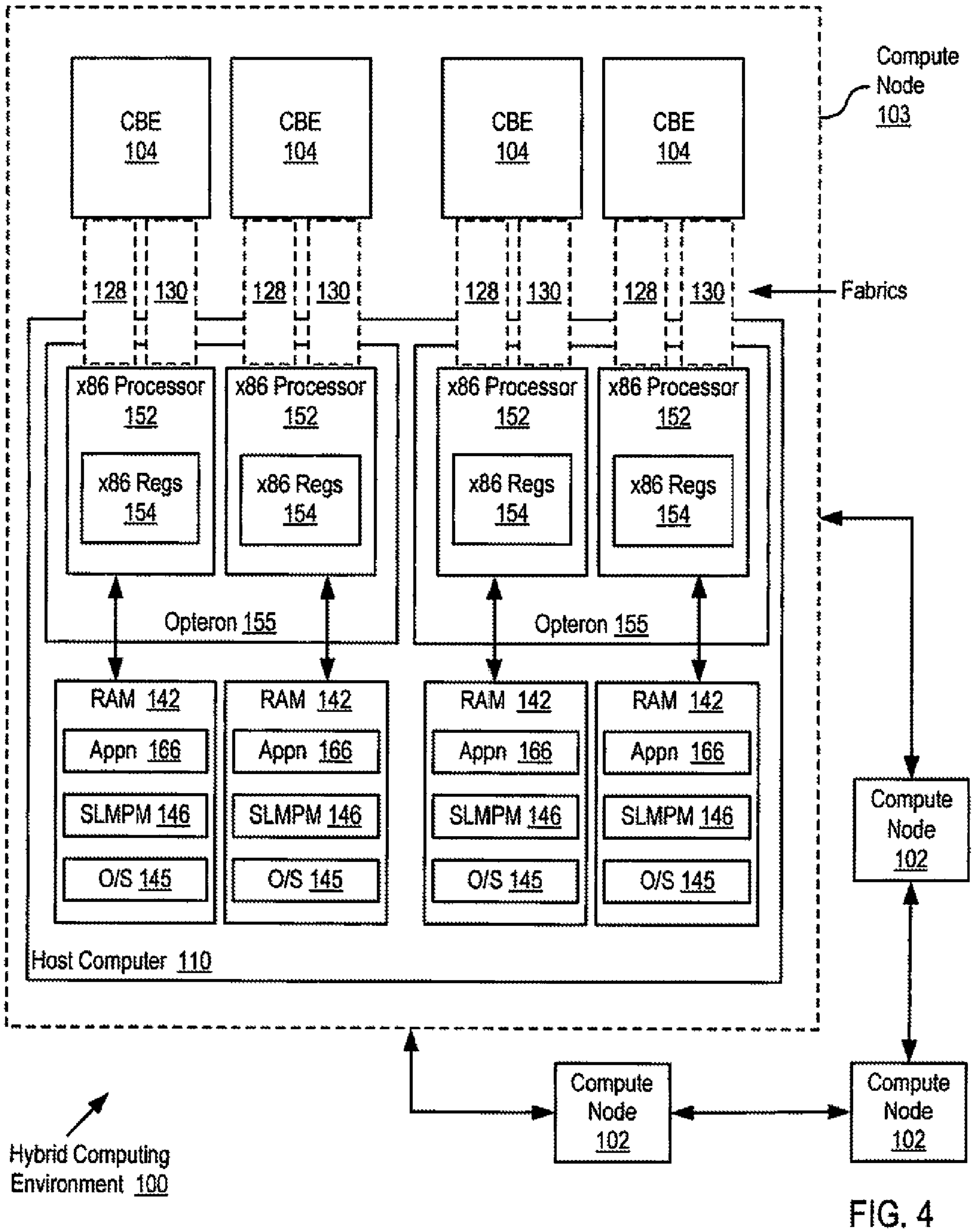
FIG. 4 sets forth a block diagram of a further exemplary hybrid computing environment useful for reducing remote reads of memory according to embodiments of the present invention.

For further explanation, FIG. 4 sets forth a block diagram of a further exemplary hybrid computing environment (100) useful for reducing remote reads of memory according to embodiments of the present invention. The hybrid computing environment of FIG. 4 is similar the hybrid computing environment of FIG. 2, including as it does, four compute nodes (102, 103), each of which includes a host computer (110) having a host computer architecture and one or more accelerators (104) each having an accelerator architecture where the accelerator architecture is optimized, with respect to the host computer architecture, for speed of execution of a particular class of computing functions. The host computer (110) and the accelerator (104) in the example of FIG. 4 are adapted to one another for data communications by a system level message passing module (146) and two or more data communications fabrics (128, 130) of at least two different fabric types. In the example of FIG. 4, the host computer (110) is adapted to accelerator (104) by an Ethernet fabric (128) and a PCIe fabric (130).

FIG. 4 illustrates an example of a hybrid computing environment similar to that implemented in the LANL supercomputer. The host computer (110), as illustrated by the expanded view of the compute node (103), implemented in the LANL supercomputer includes two AMD Opteron processors (155), each of which is a dual-core processor. Each of the cores (152) of the host computer (110) is illustrated in the example of FIG. 4 as a single, fully functional x86 processor core with each core having its own set of architectural registers (154). Each of the processor cores (152) in the example of FIG. 4 is operatively coupled to RAM (142) where an instance of an application program (166), an instance of the SLMPM (146), and an operating system (145) is stored. In the example of the LANL supercomputer, the SLMPM (146) is the Data Communication and Synchronization ('DACS') library improved according to embodiments of the present invention.

Each x86 processor core (152) in the example of FIG. 4 is adapted through an Ethernet (128) and PCIe (130) fabric to a separate accelerator (104) implemented as a CBE as described above with respect to FIG. 3. Each core (152) of each AMD Opteron processor (155) in the host computer (110) in this example is connected to at least one CBE. Although in this example the ratio of cores of the Opteron processors to CBEs (104) is one-to-one, readers of skill in the art will recognize that other example embodiments may implement different ratios of processor cores to accelerators such as, for example, one-to-two, one-to-three, and so on.

Each instance of the SLMPM (146) executing on each x86 processor core (152) in the example of FIG. 4 processes data in the hybrid computing environment (100) by monitoring data communications performance across data communications modes between the host computer (110) and the accelerator (104) connected to the processor core (152); receiving, from the instance of the application program (166) executing on the processor core (152) of the host computer (110), a request to transmit data according to a data communications mode from the host computer (110) to the accelerator (104) connected to the processor core (152); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

Figure 5:
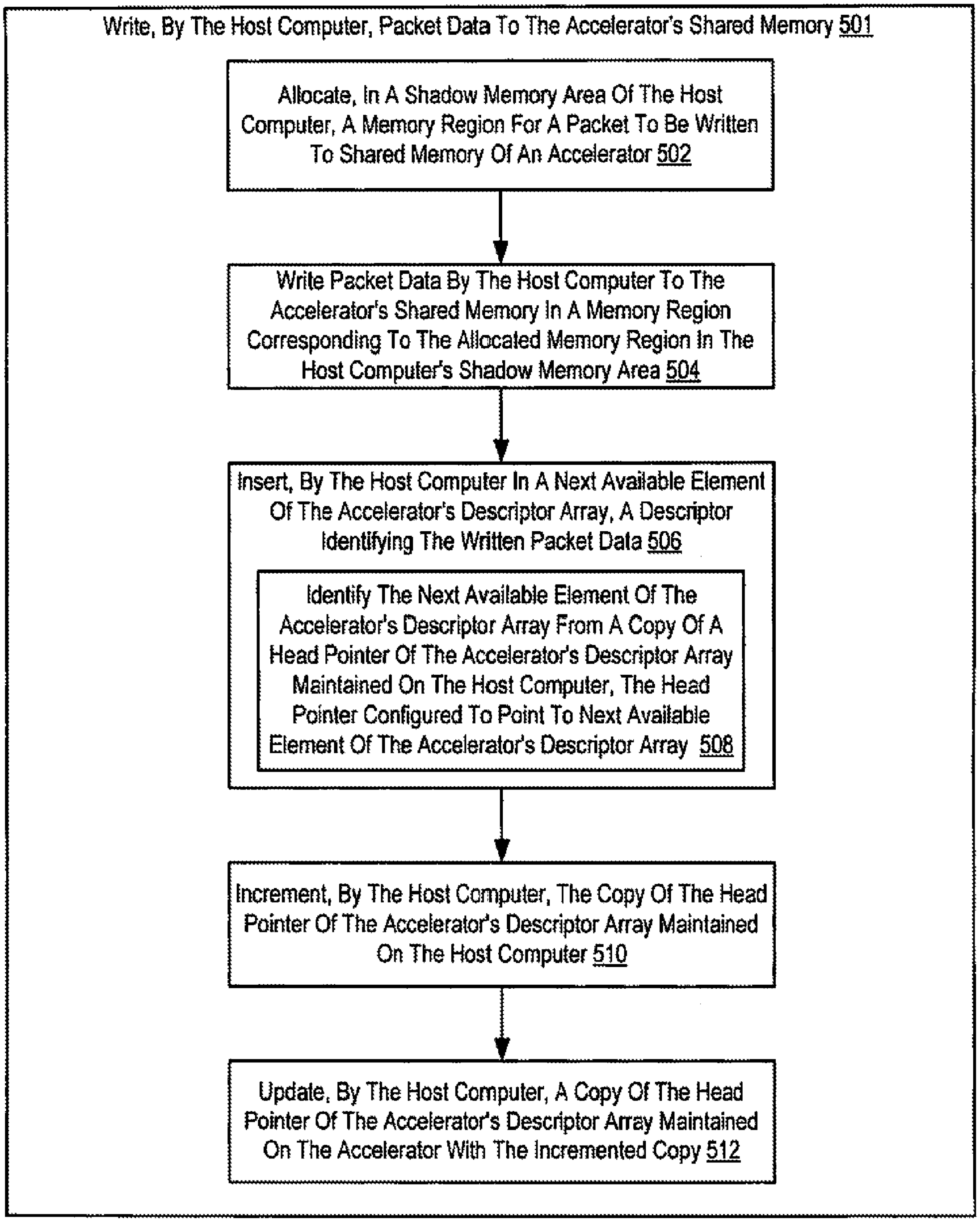
FIG. 5 sets forth a flow chart illustrating an exemplary method of reducing remote reads of memory in a hybrid computing environment according to embodiments of the present invention.

For further explanation, FIG. 5 sets forth a flow chart illustrating an exemplary method of reducing remote reads of memory in a hybrid computing environment according to embodiments of the present invention. The method of FIG. 5 is carried out in a computing environment such as for example, the hybrid computing environments described above in this specification. Such a hybrid computing environment (100 in FIG. 2) includes a host computer (110 on FIG. 2) having a host computer architecture and an accelerator (104 on FIG. 2) having an accelerator architecture, the accelerator architecture optimized, with respect to the host computer architecture, for speed of execution of a particular class of computing functions, the host computer (110 on FIG. 2) and the accelerator (104 on FIG. 2) adapted to one another for data communications by an SLMPM (146 on FIG. 2) and, optionally, by two or more data communications fabrics (128, 130 on FIG. 2) of at least two different fabric types. The host computer (110 on FIG. 2) in the hybrid computing environment that carries out the example method of FIG. 5 has local memory shared remotely with the accelerators and has a shadow memory area. Each accelerator (104, 105 on FIG. 2) of the hybrid computing environment that carries out the example method of FIG. 5 also has local memory shared remotely with the host computer and a descriptor array where the descriptor array includes a number of elements configured to store a descriptor identifying packet data to be read from the accelerator's shared memory.

The method of FIG. 5 more specifically sets forth a method of writing (501), by the host computer (110), packet data to an accelerator's (104) shared memory (158).

That is, the method of FIG. 5 sets forth a method of reducing remote reads of memory when writing (501) packet data to an accelerator's (104) shared memory (158). Such a reduction is carried out in the method of FIG. 5 by allocating (502) in the shadow memory area of the host computer a memory region for a packet to be written to the shared memory of an accelerator. The method of FIG. 5 also includes writing (504) packet data by the host computer to the accelerator's shared memory in a memory region corresponding to the allocated memory region in the host computer's shadow memory area.

The method of FIG. 5 also includes inserting (506), by the host computer in a next available element of the accelerator's descriptor array, a descriptor identifying the written packet data. In the method of FIG. 5, inserting (506) a descriptor in the accelerator's descriptor array includes identifying (508) the next available element of the accelerator's descriptor array from a copy of a head pointer of the accelerator's descriptor array maintained on the host computer. In the method of FIG. 5 the head pointer is configured to point to next available element of the accelerator's descriptor array.

The method of FIG. 5 also includes incrementing (510), by the host computer, the copy of the head pointer of the accelerator's descriptor array maintained on the host computer. The method of FIG. 5 also includes updating (512), by the host computer, a copy of the head pointer of the accelerator's descriptor array maintained on the accelerator with the incremented copy. Updating (512) a copy of the head pointer of the accelerator's descriptor array maintained on the accelerator with the incremented copy may be carried out by writing, to a predefined memory location designated as a copy of the head pointer on the accelerator, the value of the copy of the head pointer on the host computer.

Figure 6:
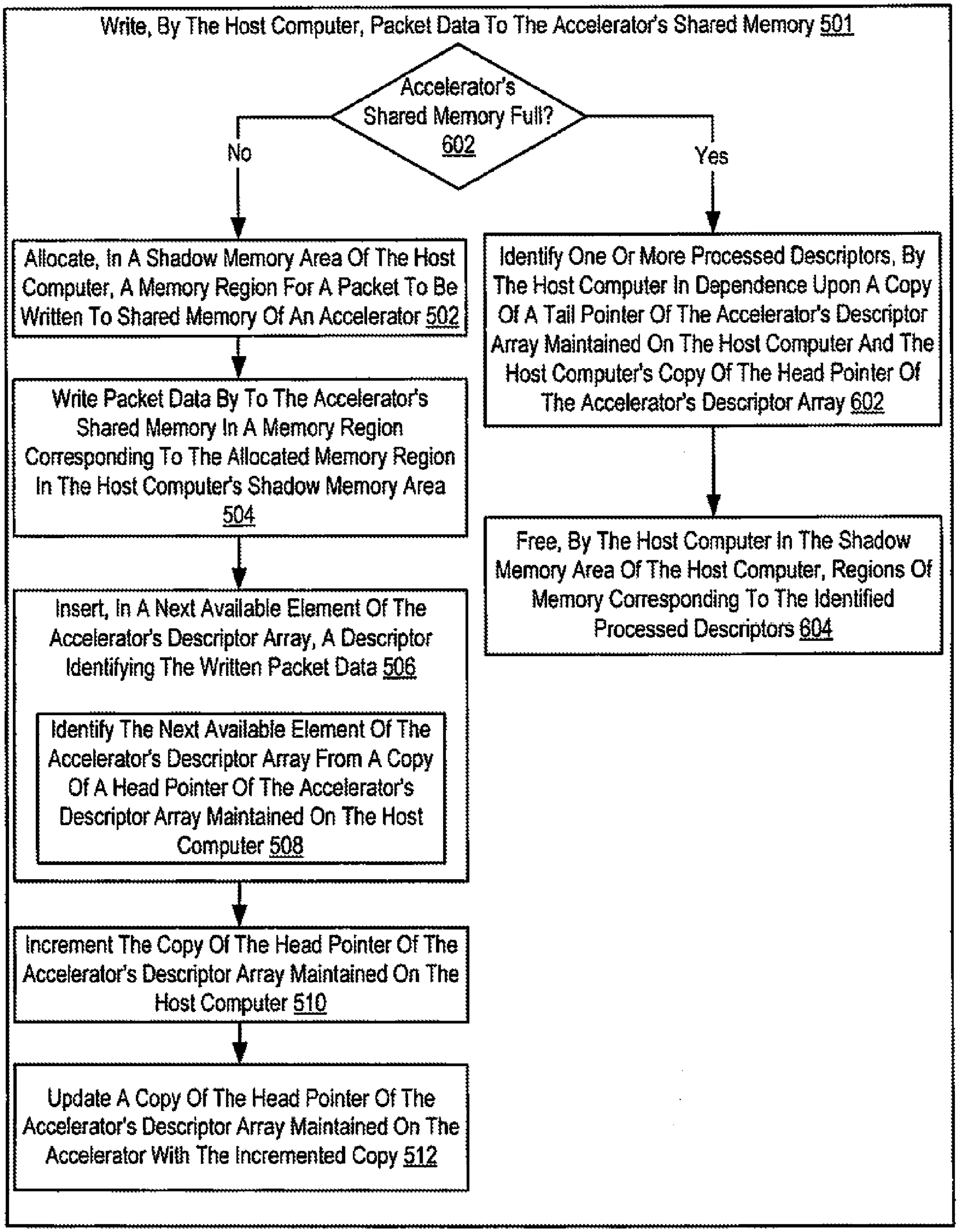
FIG. 6 sets forth a flow chart illustrating a further exemplary method of reducing remote reads of memory in a hybrid computing environment according to embodiments of the present invention.

For further explanation, FIG. 6 sets forth a flow chart illustrating a further exemplary method of reducing remote reads of memory in a hybrid computing environment according to embodiments of the present invention. The method of FIG. 6, like the method of FIG. 5 may be carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types.

The method of FIG. 6 is also similar to the method of FIG. 5 in that the host computer (110 on FIG. 2) in the hybrid computing environment that carries out the example method of FIG. 6 has local memory shared remotely with the accelerators and has a shadow memory area. Each accelerator (104, 105 on FIG. 2) of the hybrid computing environment that carries out the example method of FIG. 6 also has local memory shared remotely with the host computer and a descriptor array where the descriptor array includes a number of elements configured to store a descriptor identifying packet data to be read from the accelerator's shared memory. The method of FIG. 6 is also similar to the method of FIG. 5 in that the method of FIG. 6 includes writing (501) packet data by the host computer to the accelerator's shared memory, where writing (501) includes allocating (502), writing (504), inserting (506), incrementing (510), and updating (512) as described above with respect to FIG. 5.

Figure 7:
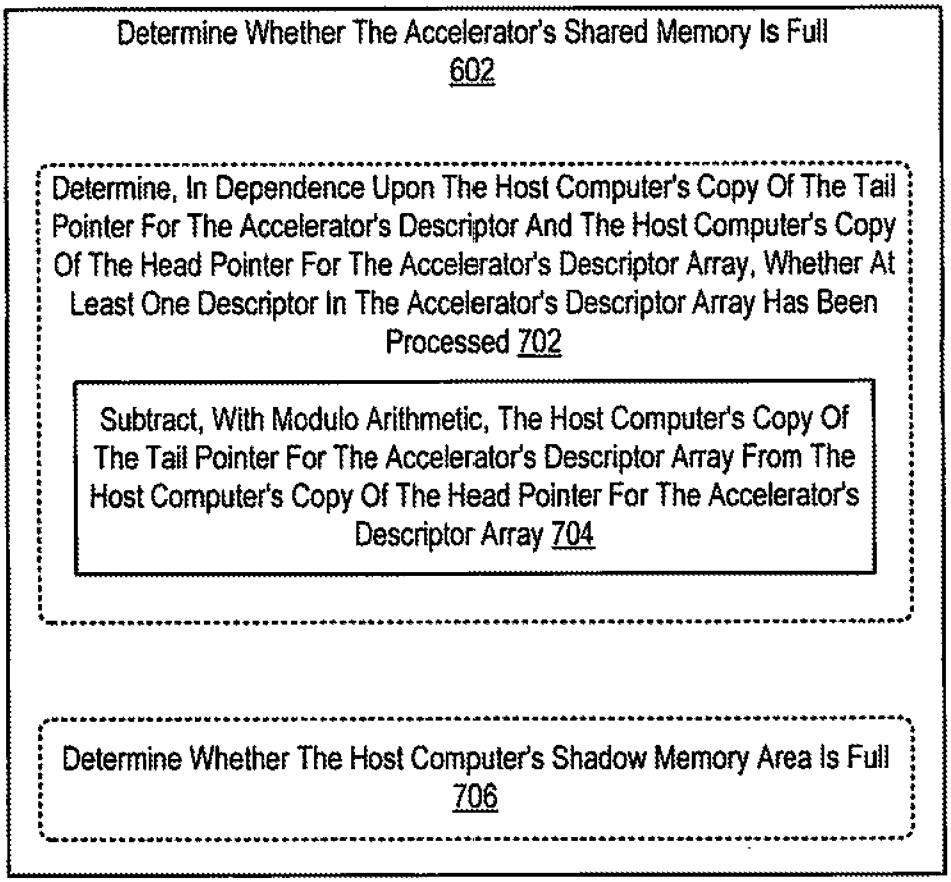
FIG. 7 sets forth a method of determining whether the accelerator's shared memory is full according to embodiments of the present invention.

The method of FIG. 6 differs from the method of FIG. 5, however, in that the method of FIG. 6 includes determining (602), by the host computer, whether the accelerator's shared memory is full. For further explanation of FIG. 6, FIG. 7 sets forth a method of determining (602) whether the accelerator's shared memory is full in accordance with embodiments of the present invention. In the method of FIG. 7, determining (602) whether the accelerator's shared memory is full includes determining (702), in dependence upon the host computer's copy of the tail pointer for the accelerator's descriptor array and the host computer's copy of the head pointer for the accelerator's descriptor array, whether at least one descriptor in the accelerator's descriptor array has been processed. In the method of FIG. 7, determining (702) whether at least one descriptor in the accelerator's descriptor array has been processed is carried out by subtracting (704), with modulo arithmetic, the host computer's copy of the tail pointer for the accelerator's descriptor array from the host computer's copy of the head pointer for the accelerator's descriptor array. Determining (602) whether the accelerator's shared memory is full, in the method of FIG. 7, also includes determining (706) whether the host computer's shadow memory area is full. Determining (706) whether the host computer's shadow memory area is full, may be carried out by calling a 'malloc( )' function and receiving a null value representing a lack of memory space in which to allocate a memory region.

Turning back to FIG. 6, if the accelerator's shared memory is full, the method of FIG. 6 continues by identifying (602) one or more processed descriptors, by the host computer in dependence upon a copy of a tail pointer of the accelerator's descriptor array maintained on the host computer and the host computer's copy of the head pointer of the accelerator's descriptor array. The method of FIG. 6 also includes freeing (604), by the host computer in the shadow memory area of the host computer, regions of memory corresponding to the identified processed descriptors. Here, the method may continue by allocating (502) a memory region as described above.

If the accelerator's shared memory is not full—or once memory regions associated with processed descriptors in the accelerator's descriptor array have been freed in the host computer's shadow memory (206)—the method of FIG. 6 continues by allocating (502), writing (504), inserting (506), incrementing (510), and updating (512) as described above with respect to FIG. 5.

Figure 8:
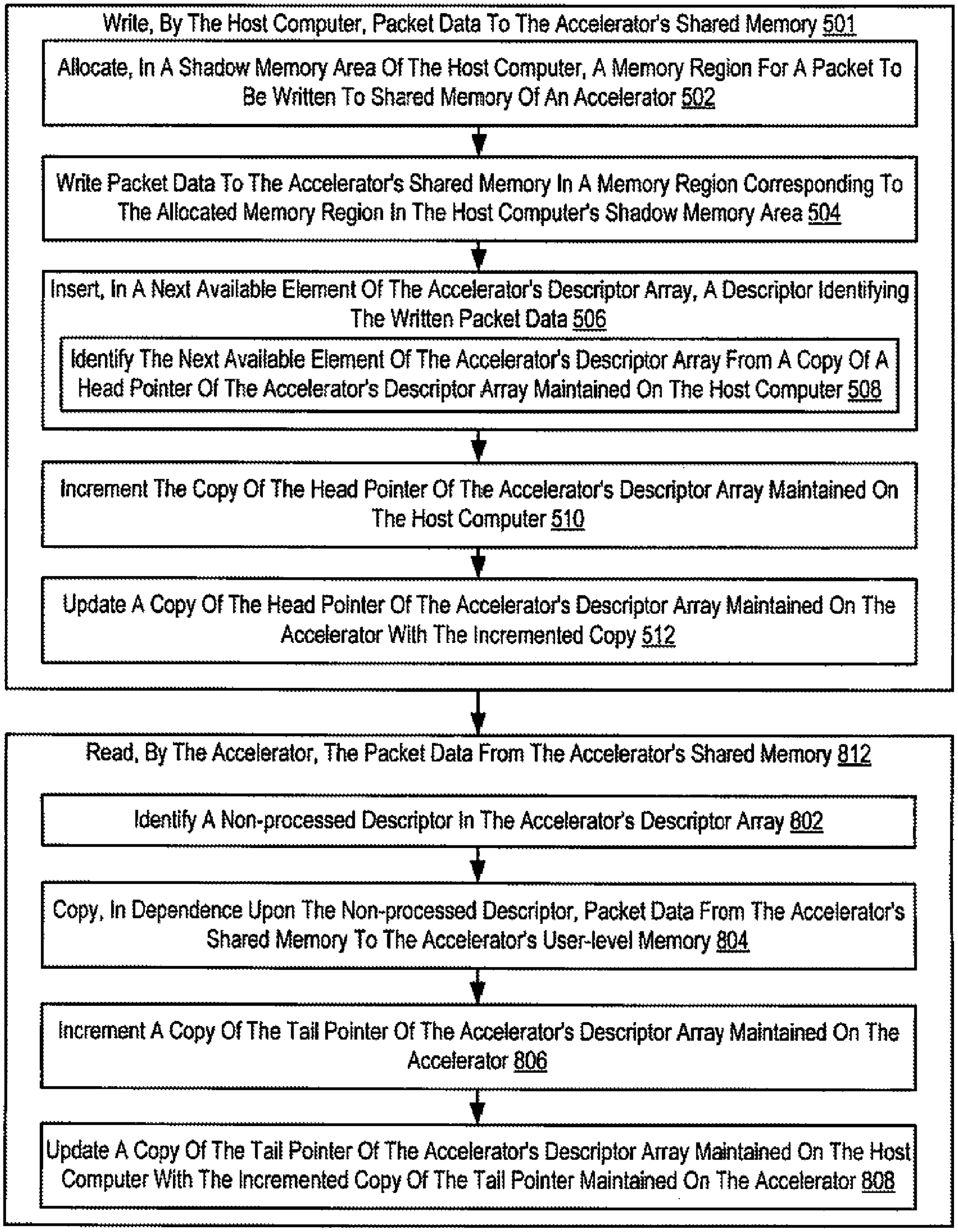
FIG. 8 sets forth a flow chart illustrating a further exemplary method of reducing remote reads of memory in a hybrid computing environment according to embodiments of the present invention.

For further explanation, FIG. 8 sets forth a flow chart illustrating a further exemplary method of reducing remote reads of memory in a hybrid computing environment according to embodiments of the present invention. The method of FIG. 8, like the method of FIG. 5 may be carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types.

The method of FIG. 8 is also similar to the method of FIG. 5 in that the host computer (110 on FIG. 2) in the hybrid computing environment that carries out the example method of FIG. 8 has local memory shared remotely with the accelerators and has a shadow memory area. Each accelerator (104, 105 on FIG. 2) of the hybrid computing environment that carries out the example method of FIG. 8 also has local memory shared remotely with the host computer and a descriptor array where the descriptor array includes a number of elements configured to store a descriptor identifying packet data to be read from the accelerator's shared memory. The method of FIG. 8 is also similar to the method of FIG. 5 in that the method of FIG. 8 includes writing (501) packet data by the host computer to the accelerator's shared memory, where writing (501) includes allocating (502), writing (504), inserting (506), incrementing (510), and updating (512) as described above with respect to FIG. 5.

The method of FIG. 8 differs from the method of FIG. 5, however in that the method of FIG. 8 also includes reading (812), by the accelerator, the packet data from the accelerator's shared memory. In the method of FIG. 5, reading (812) the packet data from the accelerator's shared memory is carried out by: identifying (802) a non-processed descriptor in the accelerator's descriptor array; copying (804), by the accelerator in dependence upon the non-processed descriptor, packet data from the accelerator's shared memory to the accelerator's user-level memory; incrementing (806) a copy of the tail pointer of the accelerator's descriptor array maintained on the accelerator, and updating (808) a copy of the tail pointer of the accelerator's descriptor array maintained on the host computer with the incremented copy of the tail pointer maintained on the accelerator. Identifying (802) a non-processed descriptor may be carried out by subtracting, with modulo arithmetic, the accelerator's copy of the tail pointer for the accelerator's descriptor array from the accelerator's copy of the head pointer for the accelerator's descriptor array.

Figure 9:
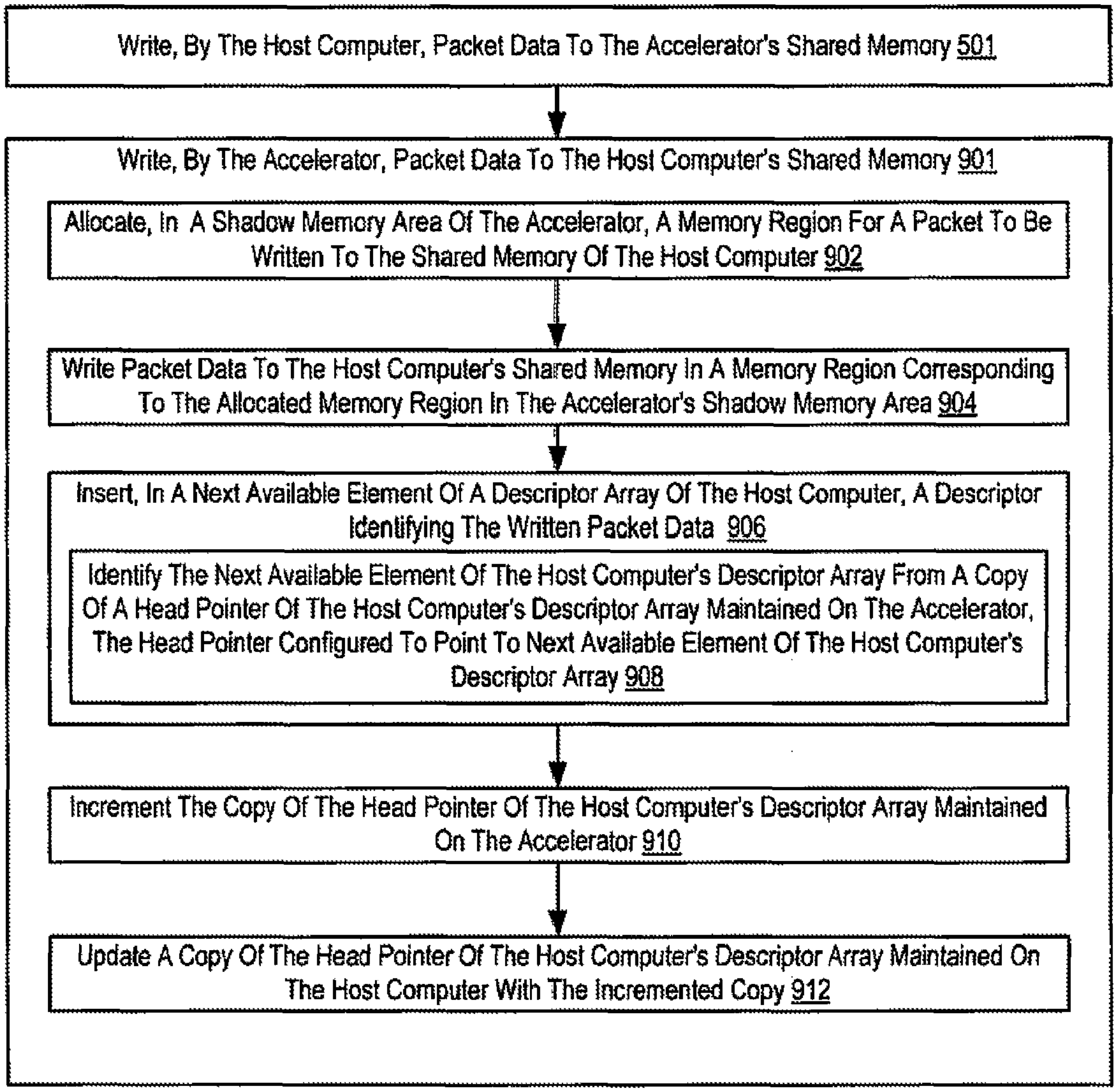
FIG. 9 sets forth a flow chart illustrating a further exemplary method of reducing remote reads of memory in a hybrid computing environment according to embodiments of the present invention.

For further explanation, FIG. 9 sets forth a flow chart illustrating a further exemplary method of reducing remote reads of memory in a hybrid computing environment according to embodiments of the present invention. The method of FIG. 9, like the method of FIG. 5 may be carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types.

The method of FIG. 9 is also similar to the method of FIG. 5 in that the host computer (110 on FIG. 2) in the hybrid computing environment that carries out the example method of FIG. 9 has local memory shared remotely with the accelerators and has a shadow memory area. Each accelerator (104, 105 on FIG. 2) of the hybrid computing environment that carries out the example method of FIG. 9 also has local memory shared remotely with the host computer and a descriptor array where the descriptor array includes a number of elements configured to store a descriptor identifying packet data to be read from the accelerator's shared memory.

The method of FIG. 9 is also similar to the method of FIG. 5 in that the method of FIG. 9 includes writing (501) packet data by the host computer to the accelerator's shared memory, where writing (501) includes allocating (502), writing (504), inserting (506), incrementing (510), and updating (512) as described above with respect to FIG. 5.

The method of FIG. 9 differs from the method of FIG. 5, however in that the method of FIG. 9 also includes writing (901) packet data to the host computer's shared memory by the accelerator. That is, FIG. 9 sets forth a method of writing data in the opposite direction than the method of FIG. 5—from accelerator to host computer rather than host computer to accelerator as in FIG. 5. Writing (901) packet data to the host computer's shared memory is carried out in a similar manner as writing (501) packet data to an accelerator's shared memory: allocating (902), in a shadow memory area of the accelerator, a memory region for a packet to be written to the shared memory of the host computer, writing (904) packet data by the accelerator to the host computer's shared memory in a memory region corresponding to the allocated memory region in the accelerator's shadow memory area; inserting (906), by the accelerator in a next available element of a descriptor array of the host computer, a descriptor identifying the written packet data including identifying (908) the next available element of the host computer's descriptor array from a copy of a head pointer of the host computer's descriptor array maintained on the accelerator, the head pointer configured to point to next available element of the host computer's descriptor array; incrementing (910), by the accelerator, the copy of the head pointer of the host computer's descriptor array maintained on the accelerator, and updating (912), by the accelerator, copy of the head pointer of the host computer's descriptor array maintained on the host computer with the incremented Copy.

Figure 10:
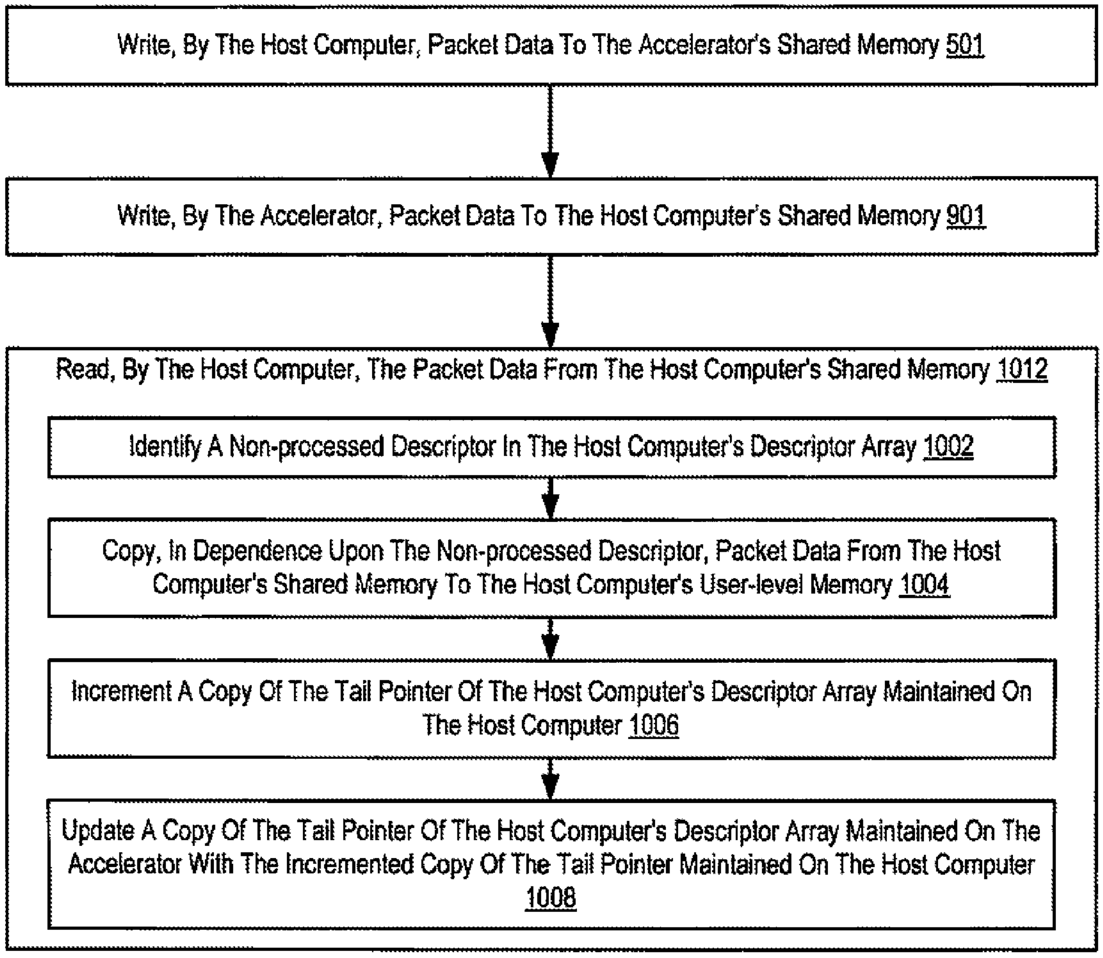
FIG. 10 sets forth a flow chart illustrating a further exemplary method of reducing remote reads of memory in a hybrid computing environment according to embodiments of the present invention.

For further explanation, FIG. 10 sets forth a flow chart illustrating a further exemplary method of reducing remote reads of memory in a hybrid computing environment according to embodiments of the present invention. The method of FIG. 10, like the method of FIG. 9 may be carried out in a hybrid computing environment similar to the hybrid computing environments described above in this specification. Such a hybrid computing environment (100 in FIG. 2) includes a host computer (110) having a host computer architecture and an accelerator (104) having an accelerator architecture, the accelerator architecture optimized, with respect to the host computer architecture, for speed of execution of a particular class of computing functions, the host computer (110) and the accelerator (104) adapted to one another for data communications by an SLMPM (146) and, optionally, by two or more data communications fabrics (128, 130 on FIG. 2) of at least two different fabric types.

The method of FIG. 10 is also similar to the method of FIG. 9 in that the host computer (110 on FIG. 2) in the hybrid computing environment that carries out the example method of FIG. 10 has local memory shared remotely with the accelerators and has a shadow memory area. Each accelerator (104, 105 on FIG. 2) of the hybrid computing environment that carries out the example method of FIG. 10 also has local memory shared remotely with the host computer and a descriptor array where the descriptor array includes a number of elements configured to store a descriptor identifying packet data to be read from the accelerator's shared memory. The method of FIG. 10 is also similar to the method of FIG. 9 in that the method of FIG. 10 includes writing (501) packet data by the host computer to the accelerator's shared memory and writing (901), by the accelerator, packet data to the host computer's shared memory.

The method of FIG. 10 differs from the method of FIG. 9, however, in that the method of FIG. 10 also includes reading (1012), by the host computer, the packet data from the host computer's shared memory. In the method of FIG. 10, reading (1012), by the host computer, the packet data from the host computer's shared memory is carried out by identifying (1002) a non-processed descriptor in the host computer's descriptor array; copying (1004), in dependence upon the non-processed descriptor, packet data from the host computer's shared memory to the host computer's user-level memory; and incrementing (1006) a copy of the tail pointer of the host computer's descriptor array maintained on the host computer, and updating (1008) a copy of the tail pointer of the host computer's descriptor array maintained on the accelerator with the incremented copy of the tail pointer maintained on the host computer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reducing remote reads of memory in a hybrid computing environment, the hybrid computing environment comprising a host computer having a host computer architecture, a plurality of accelerators having an accelerator architecture, the accelerator architecture optimized, with respect to the host computer architecture, for speed of execution of a particular class of computing functions, the host computer and the accelerators adapted to one another for data communications by a system level message passing module, the host computer having local memory shared remotely with the accelerators and having a shadow memory area, each accelerator having local memory shared remotely with the host computer, each accelerator comprising a descriptor array, the descriptor array comprising a plurality of elements, each element of the descriptor array capable of storing a descriptor identifying packet data to be read from the accelerator's shared memory, the method comprising:

allocating, by the host computer in the shadow memory area of the host computer, a memory region for a packet to be written to the shared memory of an accelerator;

writing packet data by the host computer to the accelerator's shared memory in a memory region corresponding to the allocated memory region in the host computer's shadow memory area;

inserting, by the host computer in a next available element of the accelerator's descriptor array, a descriptor identifying the written packet data including identifying the next available element of the accelerator's descriptor array from a copy of a head pointer of the accelerator's descriptor array maintained on the host computer, the head pointer configured to point to next available element of the accelerator's descriptor array;

incrementing, by the host computer, the copy of the head pointer of the accelerator's descriptor array maintained on the host computer; and updating, by the host computer, a copy of the head pointer of the accelerator's descriptor array maintained on the accelerator with the incremented copy.

2. The method of claim 1 further comprising:

determining, by the host computer, whether the accelerator's shared memory is full;

if the accelerator's shared memory is full:

identifying one or more processed descriptors, by the host computer in dependence upon a copy of a tail pointer of the accelerator's descriptor array maintained on the host computer and the host computer's copy of the head pointer of the accelerator's descriptor array; and freeing, by the host computer in the shadow memory area of the host computer, regions of memory corresponding to the identified processed descriptors; and allocating a memory region, writing packet data, inserting a descriptor, incrementing the host computer's copy of the head pointer, and updating the accelerator's head pointer only if the accelerator's shared memory is not full.

3. The method of claim 2 wherein determining whether the accelerator's shared memory is full further comprises:

determining, in dependence upon the host computer's copy of the tail pointer for the accelerator's descriptor array and the host computer's copy of the head pointer for the accelerator's descriptor array, whether at least one descriptor in the accelerator's descriptor array has been processed by subtracting, with modulo arithmetic, the host computer's copy of the tail pointer for the accelerator's descriptor array from the host computer's copy of the head pointer for the accelerator's descriptor array.

4. The method of claim 2 wherein determining whether the accelerator's shared memory is full further comprises determining whether the host computer's shadow memory area is full.

5. The method of claim 1 further comprising reading, by the accelerator, the packet data from the accelerator's shared memory, including:

identifying a non-processed descriptor in the accelerator's descriptor array;

copying, by the accelerator in dependence upon the non-processed descriptor, packet data from the accelerator's shared memory to the accelerator's user-level memory;

incrementing a copy of the tail pointer of the accelerator's descriptor array maintained on the accelerator; and updating a copy of the tail pointer of the accelerator's descriptor array maintained on the host computer with the incremented copy of the tail pointer maintained on the accelerator.

6. The method of claim 5 wherein identifying a non-processed descriptor further comprises identifying a non-processed descriptor further comprises subtracting, with modulo arithmetic, the accelerator's copy of the tail pointer for the accelerator's descriptor array from the accelerator's copy of the head pointer for the accelerator's descriptor array.

7. The method of claim 1 further comprising:

allocating, in a shadow memory area of the accelerator, a memory region for a packet to be written to the shared memory of the host computer;

writing packet data by the accelerator to the host computer's shared memory in a memory region corresponding to the allocated memory region in the accelerator's shadow memory area;

inserting, by the accelerator in a next available element of a descriptor array of the host computer, a descriptor identifying the written packet data including identifying the next available element of the host computer's descriptor array from a copy of a head pointer of the host computer's descriptor array maintained on the accelerator, the head pointer configured to point to next available element of the host computer's descriptor array;

incrementing, by the accelerator, the copy of the head pointer of the host computer's descriptor array maintained on the accelerator; and updating, by the accelerator, a copy of the head pointer of the host computer's descriptor array maintained on the host computer with the incremented copy.

8. The method of claim 7 further comprising reading, by the host computer, the packet data from the host computer's shared memory, including:

identifying a non-processed descriptor in the host computer's descriptor array;

copying, in dependence upon the non-processed descriptor, packet data from the host computer's shared memory to the host computer's user-level memory;

incrementing a copy of the tail pointer of the host computer's descriptor array maintained on the host computer; and updating a copy of the tail pointer of the host computer's descriptor array maintained on the accelerator with the incremented copy of the tail pointer maintained on the host computer.

9. A hybrid computing environment for reducing remote reads of memory in a hybrid computing environment, the hybrid computing environment comprising a host computer having a host computer architecture, a plurality of accelerators having an accelerator architecture, the accelerator architecture optimized, with respect to the host computer architecture, for speed of execution of a particular class of computing functions, the host computer and the accelerators adapted to one another for data communications by a system level message passing module, the host computer having local memory shared remotely with the accelerators and having a shadow memory area, each accelerator having local memory shared remotely with the host computer, each accelerator comprising a descriptor array, the descriptor array comprising a plurality of elements, each element of the descriptor array capable of storing a descriptor identifying packet data to be read from the accelerator's shared memory, the hybrid computing environment comprising computer program instructions capable of:

allocating, by the host computer in the shadow memory area of the host computer, a memory region for a packet to be written to the shared memory of an accelerator;

writing packet data by the host computer to the accelerator's shared memory in a memory region corresponding to the allocated memory region in the host computer's shadow memory area;

inserting, by the host computer in a next available element of the accelerator's descriptor array, a descriptor identifying the written packet data including identifying the next available element of the accelerator's descriptor array from a copy of a head pointer of the accelerator's descriptor array maintained on the host computer, the head pointer configured to point to next available element of the accelerator's descriptor array;

incrementing, by the host computer, the copy of the head pointer of the accelerator's descriptor array maintained on the host computer; and updating, by the host computer, a copy of the head pointer of the accelerator's descriptor array maintained on the accelerator with the incremented copy.

10. The hybrid computing environment of claim 9 further comprising computer program instructions capable of:

determining, by the host computer, whether the accelerator's shared memory is full;

if the accelerator's shared memory is full:

identifying one or more processed descriptors, by the host computer in dependence upon a copy of a tail pointer of the accelerator's descriptor array maintained on the host computer and the host computer's copy of the head pointer of the accelerator's descriptor array; and freeing, by the host computer in the shadow memory area of the host computer, regions of memory corresponding to the identified processed descriptors; and allocating a memory region, writing packet data, inserting a descriptor, incrementing the host computer's copy of the head pointer, and updating the accelerator's head pointer only if the accelerator's shared memory is not full.

11. The hybrid computing environment of claim 10 wherein determining whether the accelerator's shared memory is full further comprises:

determining, in dependence upon the host computer's copy of the tail pointer for the accelerator's descriptor array and the host computer's copy of the head pointer for the accelerator's descriptor array, whether at least one descriptor in the accelerator's descriptor array has been processed by subtracting, with modulo arithmetic, the host computer's copy of the tail pointer for the accelerator's descriptor array from the host computer's copy of the head pointer for the accelerator's descriptor array.

12. The hybrid computing environment of claim 10 wherein determining whether the accelerator's shared memory is full further comprises determining whether the host computer's shadow memory area is full.

13. The hybrid computing environment of claim 9 further comprising computer program instructions capable of reading, by the accelerator, the packet data from the accelerator's shared memory, including:

identifying a non-processed descriptor in the accelerator's descriptor array;

copying, by the accelerator in dependence upon the non-processed descriptor, packet data from the accelerator's shared memory to the accelerator's user-level memory;

incrementing a copy of the tail pointer of the accelerator's descriptor array maintained on the accelerator; and updating a copy of the tail pointer of the accelerator's descriptor array maintained on the host computer with the incremented copy of the tail pointer maintained on the accelerator.

14. The hybrid computing environment of claim 13 wherein identifying a non-processed descriptor further comprises, identifying a non-processed descriptor further comprises subtracting, with modulo arithmetic, the accelerator's copy of the tail pointer for the accelerator's descriptor array from the accelerator's copy of the head pointer for the accelerator's descriptor array.

15. The hybrid computing environment of claim 9 further comprising computer program instructions capable of:

allocating, in a shadow memory area of the accelerator, a memory region for a packet to be written to the shared memory of the host computer;

writing packet data by the accelerator to the host computer's shared memory in a memory region corresponding to the allocated memory region in the accelerator's shadow memory area;

inserting, by the accelerator in a next available element of a descriptor array of the host computer, a descriptor identifying the written packet data including identifying the next available element of the host computer's descriptor array from a copy of a head pointer of the host computer's descriptor array maintained on the accelerator, the head pointer configured to point to next available element of the host computer's descriptor array;

incrementing, by the accelerator, the copy of the head pointer of the host computer's descriptor array maintained on the accelerator; and updating, by the accelerator, a copy of the head pointer of the host computer's descriptor array maintained on the host computer with the incremented copy.

16. The hybrid computing environment of claim 15 further comprising computer program instructions capable of reading, by the host computer, the packet data from the host computer's shared memory, including:

identifying a non-processed descriptor in the host computer's descriptor array;

copying, in dependence upon the non-processed descriptor, packet data from the host computer's shared memory to the host computer's user-level memory;

incrementing a copy of the tail pointer of the host computer's descriptor array maintained on the host computer; and updating a copy of the tail pointer of the host computer's descriptor array maintained on the accelerator with the incremented copy of the tail pointer maintained on the host computer.

17. A computer program product for reducing remote reads of memory in a hybrid computing environment, the hybrid computing environment comprising a host computer having a host computer architecture, a plurality of accelerators having an accelerator architecture, the accelerator architecture optimized, with respect to the host computer architecture, for speed of execution of a particular class of computing functions, the host computer and the accelerators adapted to one another for data communications by a system level message passing module, the host computer having local memory shared remotely with the accelerators and having a shadow memory area, each accelerator having local memory shared remotely with the host computer, each accelerator comprising a descriptor array, the descriptor array comprising a plurality of elements, each element of the descriptor array capable of storing a descriptor identifying packet data to be read from the accelerator's shared memory, the computer program product disposed in a non-transitory computer readable storage medium, the computer program product comprising computer program instructions capable of:

allocating, by the host computer in the shadow memory area of the host computer, a memory region for a packet to be written to the shared memory of an accelerator;

writing packet data by the host computer to the accelerator's shared memory in a memory region corresponding to the allocated memory region in the host computer's shadow memory area;

inserting, by the host computer in a next available element of the accelerator's descriptor array, a descriptor identifying the written packet data including identifying the next available element of the accelerator's descriptor array from a copy of a head pointer of the accelerator's descriptor array maintained on the host computer, the head pointer configured to point to next available element of the accelerator's descriptor array;

incrementing, by the host computer, the copy of the head pointer of the accelerator's descriptor array maintained on the host computer; and updating, by the host computer, a copy of the head pointer of the accelerator's descriptor array maintained on the accelerator with the incremented copy.

18. The computer program product of claim 17 further comprising computer program instructions capable of:

determining, by the host computer, whether the accelerator's shared memory is full;

if the accelerator's shared memory is full:

identifying one or more processed descriptors, by the host computer in dependence upon a copy of a tail pointer of the accelerator's descriptor array maintained on the host computer and the host computer's copy of the head pointer of the accelerator's descriptor array; and freeing, by the host computer in the shadow memory area of the host computer, regions of memory corresponding to the identified processed descriptors; and allocating a memory region, writing packet data, inserting a descriptor, incrementing the host computer's copy of the head pointer, and updating the accelerator's head pointer only if the accelerator's shared memory is not full.

19. The computer program product of claim 17 further comprising computer program instructions capable of reading, by the accelerator,the packet data from the accelerator's shared memory, including:

identifying a non-processed descriptor in the accelerator's descriptor array;

copying, by the accelerator in dependence upon the non-processed descriptor, packet data from the accelerator's shared memory to the accelerator's user-level memory;

incrementing a copy of the tail pointer of the accelerator's descriptor array maintained on the accelerator; and updating a copy of the tail pointer of the accelerator's descriptor array maintained on the host computer with the incremented copy of the tail pointer maintained on the accelerator.

20. The computer program product of claim 19 wherein identifying a non-processed descriptor further comprises identifying a non-processed descriptor further comprises subtracting, with modulo arithmetic, the accelerator's copy of the tail pointer for the accelerator's descriptor array from the accelerator's copy of the head pointer for the accelerator's descriptor array.

21. The computer program product of claim 17 further comprising computer program instructions capable of:

allocating, in a shadow memory area of the accelerator, a memory region for a packet to be written to the shared memory of the host computer;

writing packet data by the accelerator to the host computer's shared memory in a memory region corresponding to the allocated memory region in the accelerator's shadow memory area;

inserting, by the accelerator in a next available element of a descriptor array of the host computer, a descriptor identifying the written packet data including identifying the next available element of the host computer's descriptor array from a copy of a head pointer of the host computer's descriptor array maintained on the accelerator, the head pointer configured to point to next available element of the host computer's descriptor array;

incrementing, by the accelerator, the copy of the head pointer of the host computer's descriptor array maintained on the accelerator; and updating, by the accelerator, a copy of the head pointer of the host computer's descriptor array maintained on the host computer with the incremented copy.

22. The computer program product of claim 21 further comprising computer program instructions capable of reading, by the host computer, the packet data from the host computer's shared memory, including:

identifying a non-processed descriptor in the host computer's descriptor array;

copying, in dependence upon the non-processed descriptor, packet data from the host computer's shared memory to the host computer's user-level memory;

incrementing a copy of the tail pointer of the host computer's descriptor array maintained on the host computer; and updating a copy of the tail pointer of the host computer's descriptor array maintained on the accelerator with the incremented copy of the tail pointer maintained on the host computer.

* * * * *